(12) United States Patent
Kamada et al.

(10) Patent No.: US 8,982,024 B2
(45) Date of Patent: Mar. 17, 2015

(54) LIQUID CRYSTAL DISPLAY DEVICE

(75) Inventors: Tsuyoshi Kamada, Osaka (JP); Tetsuya Ide, Osaka (JP); Seiji Ohhashi, Osaka (JP); Shohei Katsuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 244 days.

(21) Appl. No.: 13/634,309

(22) PCT Filed: Mar. 25, 2011

(86) PCT No.: PCT/JP2011/057313
§ 371 (c)(1),
(2), (4) Date: Sep. 12, 2012

(87) PCT Pub. No.: WO2011/122463
PCT Pub. Date: Oct. 6, 2011

(65) Prior Publication Data
US 2013/0002704 A1    Jan. 3, 2013

(30) Foreign Application Priority Data

Mar. 29, 2010  (JP) ................. 2010-075783

(51) Int. Cl.
*G09G 3/36* (2006.01)
*G09G 3/18* (2006.01)
(Continued)

(52) U.S. Cl.
CPC ............ *G02F 1/134309* (2013.01); *G02F 2001/134345* (2013.01); *G09G 3/3648* (2013.01);
(Continued)

(58) Field of Classification Search
CPC . G09G 3/3648; G09G 3/3614; G09G 3/3688; G09G 3/3611; G09G 3/3655; G09G 2300/0842; G09G 3/3233; G09G 3/3696; G09G 3/367; G09G 3/18; G02F 2001/134345; G02F 1/13; G02F 9/35

USPC .................... 345/50, 55, 87, 89, 92
See application file for complete search history.

(56) References Cited

U.S. PATENT DOCUMENTS

2003/0227429 A1   12/2003   Shimoshikiryo
2006/0221030 A1   10/2006   Shih et al.
(Continued)

FOREIGN PATENT DOCUMENTS

JP    62-133478 A    6/1987
JP    07-064516 A    3/1995
(Continued)

OTHER PUBLICATIONS

Official Communication issued in International Patent Application No. PCT/JP2011/057313, mailed on May 17, 2011.

*Primary Examiner* — Aneeta Yodichkas
(74) *Attorney, Agent, or Firm* — Keating & Bennett, LLP

(57) ABSTRACT

A liquid crystal display device includes: a first substrate, on which a reference potential trunk line that supplies a reference potential to a plurality of sub-pixels and a switching element of each of the plurality of sub-pixels, are disposed; and a second substrate, on which a display signal line that supplies a display signal, is disposed. A liquid crystal capacitance of each of the plurality of sub-pixels is formed between the first substrate and the second substrate. Pixels composed of the plurality of sub-pixels that correspond to a plurality of luminance regions are arranged in a matrix. In case that a prescribed half-tone is displayed in between pixels that are adjacent in the row direction, the plurality of sub-pixels that correspond to the same luminance region are arranged adjacently in the row direction.

6 Claims, 19 Drawing Sheets

(51) Int. Cl.
*G09G 3/20* (2006.01)
*G02F 1/1343* (2006.01)

(52) U.S. Cl.
CPC ...... *G09G3/3614* (2013.01); *G09G 2300/0443* (2013.01); *G09G 2300/0804* (2013.01); *G09G 2320/0247* (2013.01)
USPC .................. 345/87; 345/50; 345/55; 345/89; 345/92

(56) References Cited

U.S. PATENT DOCUMENTS

2008/0117150 A1* 5/2008 Tak et al. ....................... 345/87
2008/0238843 A1* 10/2008 Yatabe ........................... 345/87
2011/0012815 A1* 1/2011 Tsubata ......................... 345/55

FOREIGN PATENT DOCUMENTS

| | | |
|---|---|---|
| JP | 11-095722 A | 4/1999 |
| JP | 2001-296518 A | 10/2001 |
| JP | 2004-062146 A | 2/2004 |
| JP | 2004-525402 A | 8/2004 |
| JP | 2006-285238 A | 10/2006 |
| JP | 2009-223167 A | 10/2009 |
| TW | 200820186 A | 5/2008 |
| WO | 02/059685 A2 | 8/2002 |
| WO | WO/2009/122608 * | 10/2009 |

* cited by examiner

LIQUID CRYSTAL DISPLAY DEVICE

TECHNICAL FIELD

The present invention relates to a liquid crystal display device.

The subject application claims priority based on the patent application No. 2010-075783 filed in Japan on Mar. 29, 2010 and incorporates by reference herein the content thereof.

BACKGROUND ART

In recent years, high image quality has been demanded of liquid crystal display devices, and a multipixel method is used (for example, refer to Patent Document 1), in which one dot is divided into two sub-pixels and the gradation is controlled in units of sub-pixels. The multipixel method, as shown in FIG. 13 and FIG. 18 of Patent Document 1, uses two sub-pixels that are electrically equivalent. The multipixel method varies the potential on each supplementary capacitance C connected to the two sub-pixels, so as to cause a potential difference between the pixels and to control the rendering of tone.

In the multipixel method, pixels with high luminance and low luminance are controlled by the polarity of each pixel. For this reason, as shown in FIG. 19, the bright/dark relationship of each pixel under dot inversion drive alternates between pixels with a high luminance and pixels with a low luminance. FIG. 19 is a drawing that describes the bright/dark relationship of pixels in the multipixel method. In FIG. 19, the region P1 that is surrounded with a broken line indicates one pixel.

PRIOR ART DOCUMENT

Patent Document

Patent Document 1: Japanese Unexamined Patent Application, First Publication No. 2004-62146

DISCLOSURE OF INVENTION

Problem to be Solved by the Invention

In the conventional multipixel method, however, sub-pixels with a high luminance alternate with sub-pixels with a low luminance. For this reason, for example, in the case of a half-tone character, such as shown in FIG. 20-, there was the problem of the edges of the character blurring. FIG. 20 is a drawing that describes one example of the display of a half-tone character using the multipixel method. A half-tone is the rendering of a luminance (brightness) that is between a high luminance (bright) and a low luminance (dark).

The present invention was made in consideration of the above-noted problem and has as an object to provide a liquid crystal display device capable of a smooth display of the edges even in a half-tone display.

Means to Solve the Problem (1) To achieve the above-described object, one aspect of the present invention is a liquid crystal display device including: a first substrate, on which a reference potential trunk line that supplies a reference potential to a plurality of sub-pixels and a switching element of each of the plurality of sub-pixels, are disposed; and a second substrate, on which a display signal line that supplies a display signal, is disposed, wherein: a liquid crystal capacitance of each of the plurality of sub-pixels is formed between the first substrate and the second substrate; pixels composed of the plurality of sub-pixels that correspond to a plurality of luminance regions are arranged in a matrix; and, in case that a prescribed half-tone is displayed in between pixels that are adjacent in the row direction, the plurality of sub-pixels that correspond to the same luminance region are arranged adjacently in the row direction.

(2) In the liquid crystal display according to the aspect of the present invention, the reference potential trunk line may include: a first reference potential trunk line and a second reference potential trunk line; and the liquid crystal display may include the display signal line; and further including: a controller that switches potential of the first reference potential trunk line for each frame and that also switches the potential of the second reference potential trunk line for each frame to the inverse phase with respect to the first reference trunk line; and a scanning line disposed in the raw direction of a matrix; and wherein one end of the liquid crystal capacitance of a first sub-pixel may be connected to the display signal line and the other end thereof is connected to the first reference potential trunk line via the switching element; and one end of the liquid crystal capacitance of a second sub-pixel adjacent to the first sub-pixel in the column direction may be connected to the display signal line and the other end thereof is connected to the second reference potential trunk line via the switching element; the liquid crystal display may include: a first pixel in which the first sub-pixel is disposed between the first reference potential trunk line and the scanning line and the second sub-pixel is disposed between the second reference potential trunk line and the scanning line; and a second pixel in which the second sub-pixel is disposed between the first reference potential trunk line and the scanning line and the first sub-pixel is disposed between the second reference potential trunk line and the scanning line; and wherein the first sub-pixel and the second sub-pixel may be repeatedly arranged in a prescribed pattern in the row direction.

(3) In the liquid crystal display according to the aspect of the present invention, the arrangement patterns of the first pixel and the second pixel may coincide with the polarity-reversal pattern of the pixel drive.

(4) In the liquid crystal display according to the aspect of the present invention, the display signal line may include a first display signal line supplying a display signal and a second display signal line supplying a display signal; and the controller may alternately switch the polarity of the potential on the first display signal line for each row of a pixel and also alternately switches the polarity of the potential on the second display signal line for the each row of a pixel into the inverse polarity with respect to that of the first display signal line, so as to alternately switch the polarities of the potentials of the first display signal line and the second display signal line for each frame.

(5) In the liquid crystal display according to the aspect of the present invention, the controller may switch the polarity of the potential on the first display signal line for each frame and also switches the polarity of the potential on the second display signal line for each frame into the inverse polarity with respect to that of the first display signal line.

(6) In the liquid crystal display according to the aspect of the present invention, the controller may supply the display signal to the first display signal line in case that controlling the switching element of the first sub-pixel and the switching element of the third sub-pixel adjacent thereto to be on, via the scanning line; supply the display signal to the second display signal line in case that controlling the switching element of the second sub-pixel and the switching element of the fourth sub-pixel adjacent thereto to be on, via the scanning line; and switch the polarities of the potentials of the display signals on the first and second display lines during the vertical return interval.

(7) In the liquid crystal display according to the aspect of the present invention, the liquid crystal display may further include a third reference potential trunk line, wherein one end of the liquid crystal capacitance of a fifth sub-pixel adjacent to the second sub-pixel in the column direction may be connected to the first display signal line and the other end thereof may be connected to the third reference potential trunk line via the switching element; one end of the liquid crystal capacitance of a sixth sub-pixel adjacent to the fourth sub-pixel in the column direction may be connected to the second display signal line and the other end thereof may be connected to the third reference potential trunk line via the switching element; and the controller may control the potential of the third reference potential trunk line to a potential between the potential of the first reference potential trunk line and the potential of the second reference potential trunk line.

Effect of the Invention

According to the present invention, pixels that are constituted by a plurality of sub-pixels corresponding to a plurality of luminance regions are disposed in a matrix arrangement. Between pixels that are adjacent in row direction, when prescribed half-tone display is made, sub-pixels that correspond to one and the same luminance region are disposed so as to be adjacent in the row direction. By adopting this constitution, alternation of sub-pixels of the same luminance region is eliminated, thereby enabling a smooth display of edges even in a half-tone display.

Embodiments of the present invention will be described in detail below, with references being made to FIG. 1 to FIG. 18. The present invention is not restricted to these embodiments, and is subject to various modifications within the scope of the technical concept thereof.

BEST MODE FOR CARRYING OUT THE INVENTION

[First Embodiment]

Figure 1:
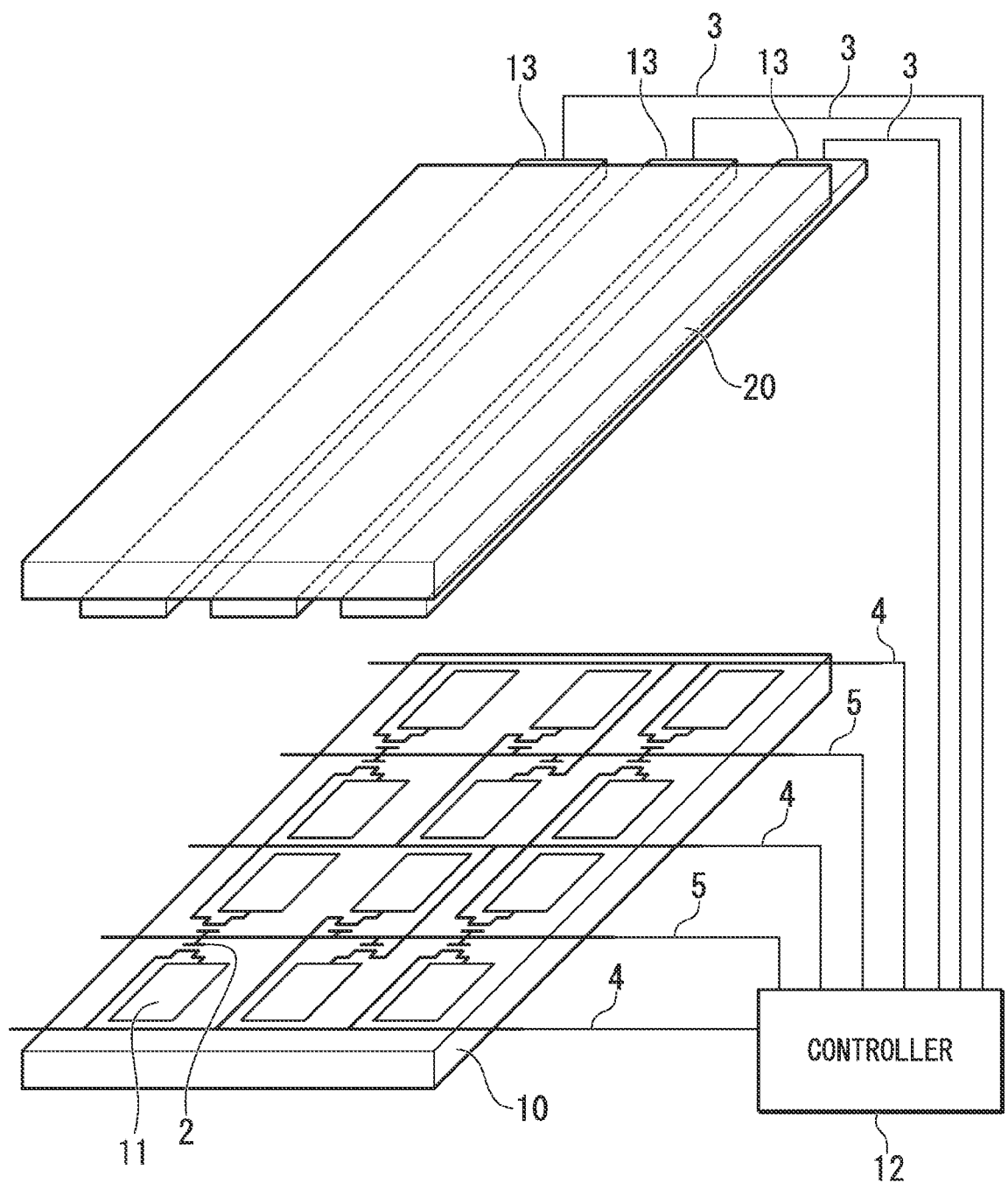
FIG. 1 is an oblique view showing one example of a liquid crystal display device according to a first embodiment.

FIG. 1 is an oblique view showing one example of a liquid crystal display device to which the first embodiment is applied. As shown in FIG. 1, the liquid crystal display device of the first embodiment has the first substrate 10, a second substrate 20, and a controller 12. A liquid crystal is sealed between the first substrate 10 and the second substrate 20. The first substrate 10 has a plurality of switching elements 2 implemented by TFTs (thin-film transistors), a plurality of reference potential trunk lines 4, a plurality of scanning lines (gate bus lines) 5, and display electrodes 11. Additionally, the second substrate 20 has transparent electrodes 13. The transparent electrodes 13 are each connected to a display signal line (data bus line) 3. In this manner, the switching elements 2, the reference potential trunk lines 4, the scanning lines 5, and the display electrodes 11 are formed on the first substrate 10. On the second substrate 20 that is in opposition to the first substrate 10, strip-shaped transparent electrodes 13 that are connected to the display signal lines 3 are formed, thereby constituting an opposing matrix.

Figure 2:
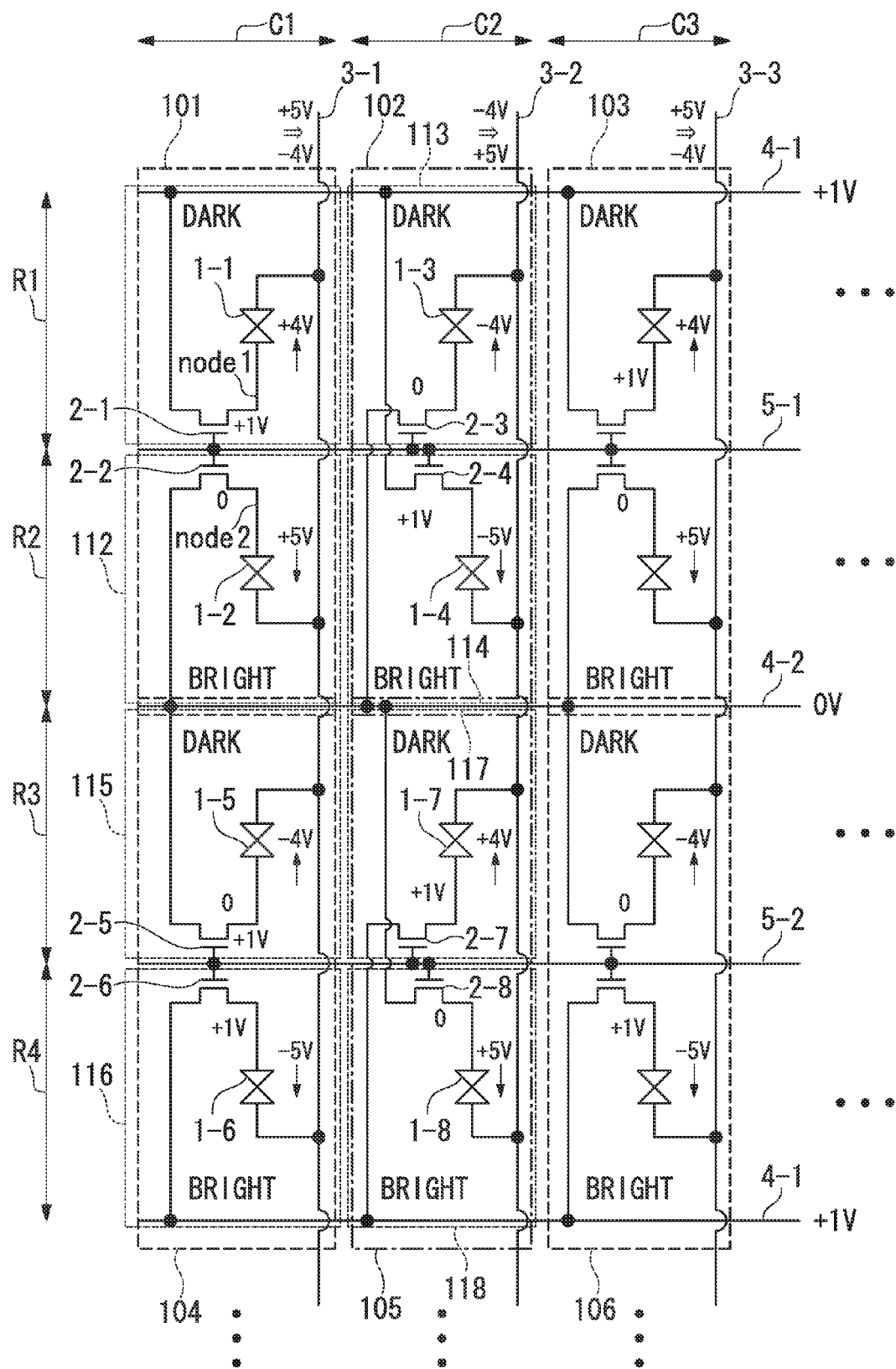
FIG. 2 is an equivalent electrical circuit diagram describing the operation of the liquid crystal display device according to the same embodiment.
Figure 3:
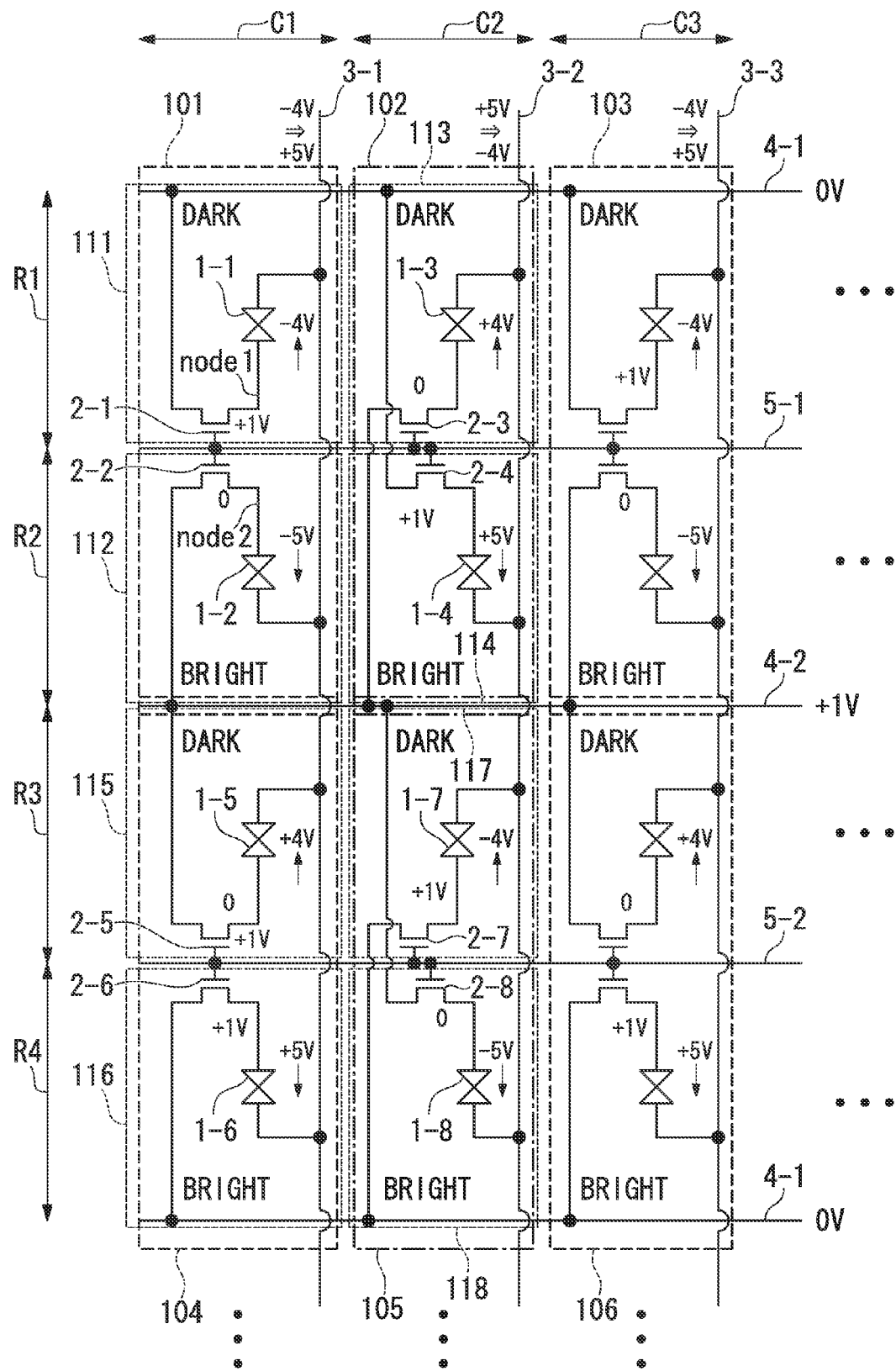
FIG. 3 is an equivalent circuit diagram describing another operation of the liquid crystal display device according to the same embodiment.

FIG. 2 and FIG. 3 are equivalent circuit diagrams that describe the operation of the liquid crystal display device according to the first embodiment. In FIG. 2 and FIG. 3, as shown by the reference symbols R1 to R4, the liquid crystal display device that includes sub-pixels for the 1st to the 4th rows in the row direction is shown. In FIG. 2 and FIG. 3, as shown by the reference symbols C1 to C3, the liquid crystal display device that has sub-pixels in the 1st to the 3rd columns in the column direction is shown.

FIG. 2 and FIG. 3 show the condition for each frame. As shown in FIG. 2, the liquid crystal display device of the first embodiment has pixels 101 to 106. Each of the pixels 101 to 106 further has two sub-pixels. The pixels 101 and 102 are disposed so as to be adjacent in the row direction. The pixel 101 has, with respect to the column direction, the sub-pixel (first sub-pixel) 111 and the sub-pixel (second sub-pixel) 112 disposed in that sequence. The pixel 102 has, with respect to the column direction, the sub-pixel (third sub-pixel) 113 and the sub-pixel (fourth sub-pixel) 114 disposed in that sequence. The pixel 104 and the pixel 105, which are disposed so as to be adjacent in the row direction, are disposed in linear symmetry with the pixel 101 and the pixel 102, with respect to a second reference potential trunk line 4-2. The pixel 104 has, with respect to the row direction, the sub-pixel (first sub-pixel) 116 and the sub-pixel (second sub-pixel) 115 disposed in that sequence. The pixel 105 has, with respect to the row direction, the sub-pixel (third sub-pixel) 118 and the sub-pixel (fourth sub-pixel) 117 disposed in that sequence.

Additionally, each sub-pixel has a liquid crystal capacitance (a capacitor implemented with a liquid crystal for each pixel, hereinafter referred to as a liquid crystal capacitance) 1, a switching element 2, and a display electrode 11. For example, the sub-pixel 111 has the liquid crystal capacitance 1-1 and the switching element 2-1, and the sub-pixel 112 has the liquid crystal capacitance 1-2 and the switching element 2-2. One frame is, for example, in the case of a liquid crystal display device driven by 60-Hz, 1/60 s.

The constitution of the sub-pixel 111 and sub-pixel 112 of the pixel 101 will first be described. The gate electrodes of the switching element 2-1 and the switching element 2-2 are connected to a common scanning line 5-1. The source terminal of the switching element 2-1 is connected to a first reference potential trunk line 4-1. The drain terminal of the switching element 2-1 is connected to one end (node 1) of the liquid crystal capacitance 1-1, via the display electrode 11. The other end of the liquid crystal capacitance 1-1 is connected to a display signal line (first display signal line) 3-1, via a transparent electrode 13. The source terminal of the switching element 2-2 is connected to the second reference potential trunk line 4-2. The drain terminal of the switching element 2-2 is connected to one end (node 2) of the liquid crystal capacitance 1-2. The other end of the liquid crystal capacitance 1-2 is connected to a display signal line 3-1, via the transparent electrode 13.

Next, the constitution of the sub-pixels 113 and 114 of the pixel 102 will be described. The gate electrodes of the switching element 2-3 and the switching element 2-4 are connected to the common scanning line 5-1. The source terminal of the switching element 2-3 is connected to the second reference potential trunk line 4-2. The drain terminal of the switching element 2-3 is connected to one end of a liquid crystal capacitance 1-3. The other end of the liquid crystal capacitance 1-3 is connected to a display signal line (second display signal line) 3-2, via the transparent electrode 13. The source terminal of the switching element 2-4 is connected to the first reference potential trunk line 4-1. The drain terminal of the switching element 2-4 is connected to one end of the liquid crystal capacitance 1-4. The other end of the liquid crystal capacitance 1-4 is connected to the display signal line 3-2, via the transparent electrode 13.

Figure 4:
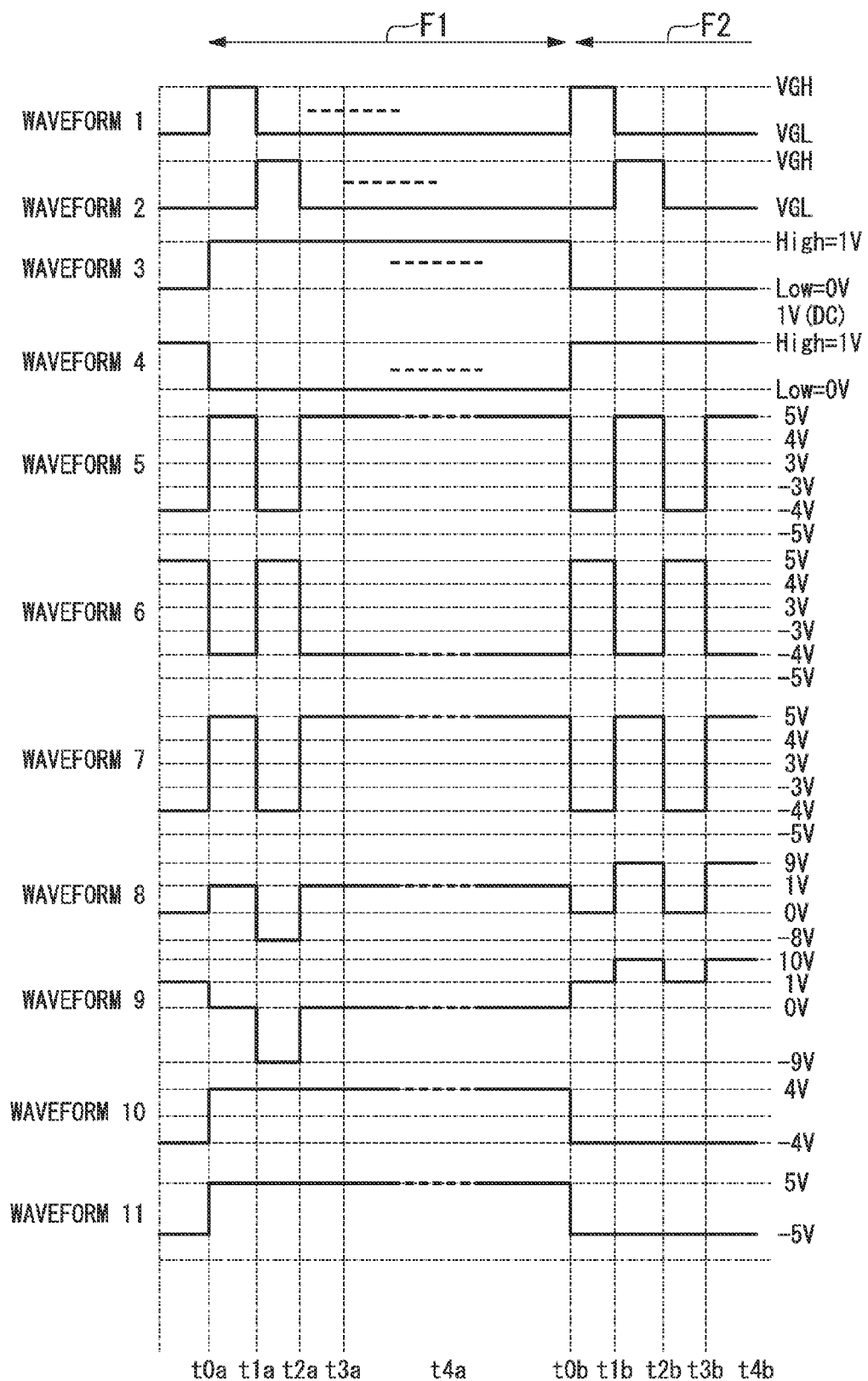
FIG. 4 is a timing diagram of the liquid crystal display device at the Lth frame and at the (L+1)th frame according to the same embodiment.

Next, the operation of the liquid crystal display device will be described, using FIG. 2 and FIG. 4. The first embodiment is an example of dot-inversion drive, in which the controller 12 performs control so as to switch the polarity of the potential of the display signal lines 3-1 to 3-3 for each dot (pixel). FIG. 4 is a timing diagram of the liquid crystal display device at the Lth frame and the (L+1)th frame in the first embodiment. First, the sub-pixel 111 and the sub-pixel 112 of the pixel 101 at the Lth frame (where L is a natural number 1 or larger) will be described.

FIG. 4 shows the case in which the Lth frame is the first frame (1st-frame) F1, and the (L+1)th frame is the second frame (2nd-frame) F2.

In FIG. 4, the horizontal axis represents time, and the vertical axis represents electrical potential. The waveform 1 in FIG. 4 shows the time variations of the potential on the scanning line 5-1. The waveform 2 in FIG. 4 shows the time variations of the potential on the scanning line 5-2. The waveform 3 in FIG. 4 shows the time variations of the potential on the first reference potential trunk line 4-1. The waveform 4 in FIG. 4 shows the time variations of the potential on the second reference potential trunk line 4-2. The waveform 5 in FIG. 4 shows the time variations of the potential on the display signal line 3-1. The waveform 6 in FIG. 4 shows the time variations of the potential on the display signal line 3-2. The waveform 7 in FIG. 4 shows the time variations of the potential on the display signal line 3-3. The waveform 8 in FIG. 4 shows the time variations of the potential on the node 1. The waveform 9 in FIG. 4 shows the time variations of the potential on the node 2. The waveform 10 in FIG. 4 shows the time variations of the potential between the display signal line 3-1 and the node 1 (voltage applied to the liquid crystal capacitance of the first sub-pixel). The waveform 11 in FIG. 4 shows the time variations of the potential between the display signal line 3-1 and the node 2 (voltage applied to the liquid crystal capacitance of the second sub-pixel).

The controller 12 controls the first reference potential trunk line 4-1 to +1 V (waveform 1 in FIG. 4 at time t0a), and controls the second reference potential trunk line 4-2 to 0 V (waveform 2 in FIG. 4 at time t0a). Next, the controller 12 controls the scanning line 5-1 to the high level between times t0a to t1a (waveform 1 in FIG. 4), thus placing the switching element 2-1 and the switching element 2-2 into the on state. The period during which the output of the scanning line 5-1 is high is set in accordance with the total number of gate data buses 3 that can be used in the liquid crystal display device. In a liquid crystal display device that accommodates full HD, for example, the period during which the output of the scanning line 5-1 is high corresponds to 1/(60×1080) (s). Additionally, the controller 12 alternately switches the polarity of the potential on the display signal line 3-1 for each dot (pixel) (waveform 5 in FIG. 4). That is, the controller 12 supplies, for example, a signal having a potential of +5 V to +2 V at the first row of a pixel and supplies a signal having a potential of −4 V to −1 V at the second row of a pixel. In the following, the operation of each pixel for the case in which the maximum potential signal is supplied to the display signal line 3-1 and to the display signal line 3-2 will be described (waveform 5 and waveform 7 in FIG. 4).

As an example, in the case of a transmission type liquid crystal display device in which a backlight (not shown) is disposed below the first substrate 10, the luminance (tone rendering) is controlled by the controller 12 controlling the light transmissivity of each sub-pixel. Alternatively, in the case of a reflective-type liquid crystal display device, the luminance (tone rendering) is controlled by the controller 12 controlling the light reflectivity of each sub-pixel.

During the time period t0a to t1a, the switching element 2-1 is on. As a result, the potential difference between +5 V on the display signal line 3-1 and +1V on the first reference potential trunk line 4-1, this being +4 V, is generated at the liquid crystal capacitance 1-1. After time t1a, at which the switching element 2-1 switches to off, the liquid crystal capacitance 1-1 holds the potential difference +4 V until the next frame, L+1.

During the time period t0a to t1a, the switching element 2-2 is on, and the potential difference between +5 V on the display signal line 3-1 and 0 V on the second reference potential trunk line 4-2, this being +5V, is generated at the liquid crystal capacitance 1-2. After time t1a, at which the switching element 2-2 switches to off, the liquid crystal capacitance 1-2 holds the potential different +5 V until the next frame, L+1.

In FIG. 2, the upward-pointing arrows and the downward-pointing arrows indicate the direction of generation of the potential difference. For example, in the liquid crystal capacitance 1-1, taking the terminal connected to the switching element 2-1 as the reference, a generation of a potential that is positive is indicated at the display signal line 3-1.

As a result, a potential difference of +4 V is generated at the liquid crystal capacitance 1-1 of the sub-pixel 111, and a potential difference of +5 V is generated at the liquid crystal capacitance 1-2 of the sub-pixel 112. For this reason, the sub-pixel 112, having a large potential difference, is displayed with a higher luminance than the sub-pixel 111. For this reason, the sub-pixel 111 is displayed dark, and the sub-pixel 112 is displayed bright.

Next, the operation of the sub-pixel 113 and the sub-pixel 114 of the pixel 102 at the Lth frame will be described.

The controller 12 controls the scanning line 5-1 to the high level during the time t0a to t1a (waveform 1 in FIG. 4), and the switching element 2-3 and the switching element 2-4 are placed in the on state. The controller 12 alternately switches the polarity of the potential on the display signal line 3-2 for each dot (waveform 6 in FIG. 4). That is, the controller 12 supplies a signal having a potential of −4 V to −1 V at the first row of a pixel and supplies a signal having a potential of +5 V to +2 V at the second row of a pixel. The operation of each pixel will be described below, for the case of applying the maximum potential to the display signal line 3-2.

Therefore, the potential difference between −4 V on the display signal line 3-2 and 0 V on the second reference potential trunk line 4-2, this being −4 V, is generated at the liquid crystal capacitance 1-3. After time t1a, at which the switching element 2-3 switches to off, the liquid crystal capacitance 1-3 holds the potential difference −4 V until the next frame, L+1.

In the same manner, the potential difference between −4 V on the digital signal line 3-2 and +1 V on the first reference potential trunk line 4-1, this being +5 V, is generated at the liquid crystal capacitance 1-4. After time t1a, at which the switching element 2-3 switches to off, the liquid crystal capacitance 1-4 holds the potential difference −5 V until the next frame, L+1.

As a result, a potential difference of −4 V is generated at the liquid crystal capacitance 1-3 of the sub-pixel 113, and a potential difference of −5 V is generated at the liquid crystal capacitance 1-4 of the sub-pixel 114. For this reason, the sub-pixel 114, having a large potential difference, is displayed with higher luminance than the sub-pixel 113. For this reason, the sub-pixel 113 is displayed dark, and the sub-pixel 114 is displayed bright.

The pixel 103 is constituted the same as the pixel 101. Similarly, the potential applied to the display signal line 3-3 is the same as that applied to the display signal line 3-1. For this reason, the pixel 103 operates in the same manner as the pixel 101.

The pixels 104 to 106 are connected to the second reference potential trunk line 4-2, the first reference potential trunk line 4-1, the scanning line 5-2, and the display signal lines 3-1 to 3-2.

The difference between the operation of the pixels 101 to 103 is that the controller 12 controls the scanning line 5-2 to which each of the switching elements 2 is in the on state during the time t1a to t2a (waveform 2 in FIG. 4). The controller 12 alternately switches the potential on each of the display signal lines 3-1 to 3-2 for each dot. For this reason, the display signal line 3-1 with respect to the pixel 104 is supplied with −4 V (waveform 5 in FIG. 4). Also, the display signal line 3-2 with respect to the pixel 105 is supplied with +5 V (waveform 6 in FIG. 4), and the display signal line 3-3 with respect to the pixel 105 is supplied with −4 V (waveform 7 in FIG. 4).

Therefore, the potential difference between −4 V on the display signal line 3-1 and 0 V on the second reference potential trunk line 4-2, this being −4 V, is generated at the liquid crystal capacitance 1-5 of the sub-pixel 115 of the pixel 104. Also, the potential difference between −4 V on the display signal line 3-1 and +1 V on the first reference potential trunk line 4-1, this being −5 V, is generated at the liquid crystal capacitance 1-6 of the sub-pixel 116. The potential difference between +5 V on the display signal line 3-2 and +1 V on the first reference potential trunk line 4-1, this being +4 V, is generated on the liquid crystal capacitance 1-7 of the sub-pixel 117 of the pixel 105. The potential difference between +5 V on the display signal line 3-2 and 0 V on the second reference potential trunk line 4-2, this being +5 V, is generated at the liquid crystal capacitance 1-8 of the sub-pixel 118. Because the pixel 106 has the same constitution as the pixel 104, it operates in the same manner as the pixel 104.

As a result, the potential difference of each liquid crystal capacitance 1 of each sub-pixel of each of the pixels 101 to 106 is as shown in FIG. 2. That is, at the time of the Lth frame, the 1st row (reference symbol R1) has pixels in a dark luminance region are arranged in the row direction, the 2nd row (reference symbol R2) has pixels in a light luminance region arranged, the 3rd row (reference symbol R3) has pixels in a dark luminance region arranged, and the 4th row (reference symbol R4) has pixels in a light luminance region arranged. In a liquid crystal display device using a conventional multipixel method, sub-pixels in different luminance regions are disposed so as to be arranged to be adjacent in the row direction. In contrast, in the first embodiment, as shown in FIG. 2, sub-pixels of the same luminance are disposed so as to be adjacent in the row direction.

Next, the operation at the (L+1)th frame will be described, using FIG. 3 and FIG. 4. The timing diagram of FIG. 4 shows the (L+1)th frame after the time t0b (second frame F2). The difference with respect to the time of the Lth frame in FIG. 3 is that, during the vertical return interval, the controller 12 switches the polarity of the potentials on the display signal lines 3-1 to 3-3 to the polarity that is the reverse of the polarity in the Lth frame. That is, the controller 12, during the first row of a pixel, supplies a signal having a potential of −4 V from the display signal line 3-1, and supplies a signal having a potential of +5 V from the display signal line 3-2. The controller 12 also alternately switches the polarity of the potentials on the display signal lines 3-1 to 3-3 for each dot. That is, for the display signal line 3-1, the controller 12 performs control so as to supply a signal having a potential from a maximum potential of +5 V to a minimum potential of +2 V for the first row of a pixel, and so as to supply a signal having a potential from a maximum potential of −4 V to a minimum potential of −1 V for the second row of a pixel. The operation of each pixel will be described below, for the case of applying the maximum potential to the display signal lines 3-1 to 3-3. Additionally, at the time t0b, the control circuit 12 switches the potential on the first reference potential trunk line 4-1 from +1 V to 0 V (waveform 3 in FIG. 4), and switches the potential on the second reference potential trunk line 4-2 from 0 V to +1 V (waveform 4 in FIG. 4).

The potential difference between −4 V on the display signal line 3-1 and 0 V on the first reference potential trunk line 4-1, this being −4 V, is generated at the liquid crystal capacitance 1-1 of the sub-pixel 111 of the pixel 101. At the same time, the potential difference between −4 V of the display signal line 3-1 and +1 V of the second reference potential trunk line 4-2, this being −5 V, is generated at the liquid crystal capacitance 1-2 of the sub-pixel 112. As a result, the sub-pixel 112, having a large potential difference, is displayed with a higher luminance than the sub-pixel 111, the sub-pixel 111 being displayed dark, and the sub-pixel 112 being display bright. Because the constitution of the pixel 103 is the same as that of the pixel 101, it operates in the same manner as the pixel 101.

Additionally, the potential difference between +5 V on the display signal line 3-2 and +1 V on the second reference potential trunk line 4-2, this being +4 V, is generated at the liquid crystal capacitance 1-3 of the sub-pixel 113 of the pixel 102. In the same manner, the potential difference between +5 V of the display signal line 3-2 and 0 V of the first reference potential trunk line 4-1, this being +5 V, is generated at the liquid crystal capacitance 1-4 of the sub-pixel 114. As a result, the sub-pixel 114, having a large potential difference, is displayed with a higher luminance than the sub-pixel 113, sub-pixel 113 being displayed dark, and sub-pixel 114 being displayed bright.

Additionally, the potential difference between +5 V of the display signal line 3-1 and +1 V of the second reference potential trunk line 4-2, this being +4 V, is generated at the liquid crystal capacitance 1-5 of the sub-pixel 115 of the pixel 104. Also, the potential difference between +5 V on the display signal line 3-1 and 0 V on the first reference potential trunk line 4-1, this being +5 V is generated at the liquid crystal capacitance 1-6 of the sub-pixel 116. The potential difference between −4 V of the display signal line 3-2 and 0 V of the first reference potential trunk line 4-1, this being −4 V, is generated at the liquid crystal capacitance 1-7 of the sub-pixel 117 of the pixel 105. The potential difference between −4 V on the display signal line 3-2 and +1 V on the second reference potential trunk line 4-2, this being −5 V, is generated on the liquid crystal capacitance 1-8 of the sub-pixel 118. Because the constitution of the pixel 106 is the same as that of the pixel 104, it operates in the same manner as the pixel 104.

As described above, the (L+1)th frame is similar to the Lth frame shown in FIG. 2. That is, pixels in a dark luminance region are arranged in the row direction in the first row (reference symbol R1 in FIG. 3), pixels in a bright luminance region are arranged in the second row (reference symbol R2 in FIG. 3), pixels in a dark luminance region are arranged in the row direction in the third row (reference symbol R3 in FIG. 3), and pixels in a bright luminance region are arranged and displayed in the fourth row (reference symbol R4 in FIG. 3). In this manner, even if sub-pixels in the same luminance region are disposed so as to be adjacent in the row direction, the bright/dark disposition of each sub-pixel does not change for each frame. For this reason, even in an image with distinct edges, it is possible to achieve a smooth display.

Figure 5A:
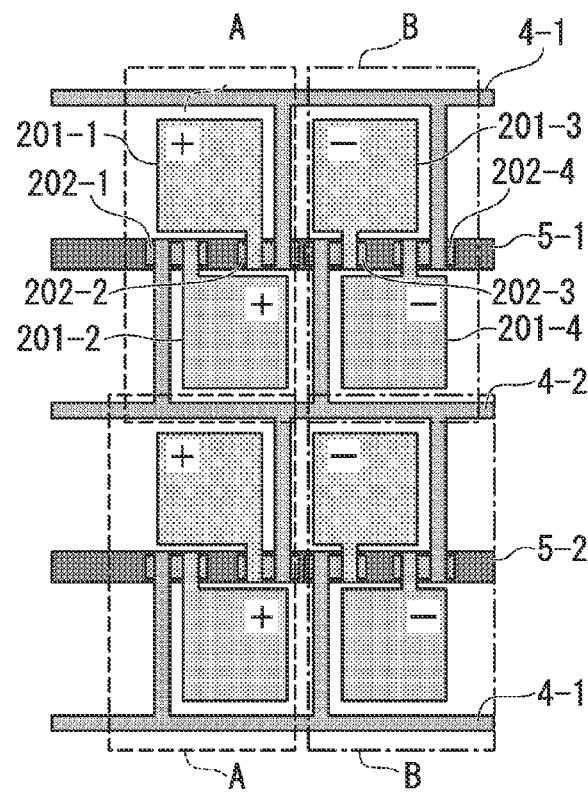
FIG. 5A is a drawing describing a layout example on a first substrate 10 according to the same embodiment.
Figure 5B:
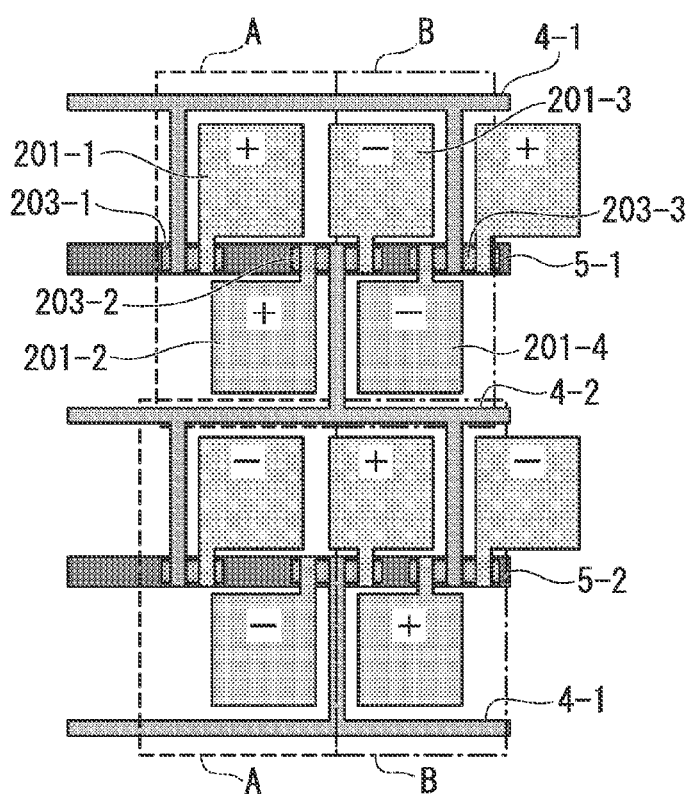
FIG. 5B is a drawing describing another layout example on the first substrate 10 according to the same embodiment.

FIG. 5A and FIG. 5B are drawings describing examples of layouts on the first substrate 10 in the first embodiment.

FIG. 5A is an example of a layout in which each reference potential trunk line is connected to each sub-pixel. FIG. 5B is an example of a layout in which groups of two pixels are connected to each of the reference potential trunk lines. Because the number of interconnect patterns is smaller in FIG. 5B than in FIG. 5A, the numerical aperture can be increased.

The transparent electrode 13, to which the display signal lines 3-1 to 3-3 are connected, is above the opposing second substrate 20. For this reason, in FIG. 5A, FIG. 5B, and FIG. 6, the reference potential trunk lines 4-1 to 4-2, the scanning lines 5-1 to 5-2, the switching elements 2, and the display electrodes 11 are formed over the first substrate 10.

In FIG. 5A and FIG. 5B, the sub-pixels (switching elements 2 and display electrodes 11) 201-1 to 201-4 are connected to the reference potential trunk lines 4-1 to 4-2 via the connecting parts 201-1 to 202-4, and 203-1 to 203-4. In the conventional multipixel drive (MPD) method that does not use an opposing matrix, in the event that sub-pixels having the same luminance are disposed in the row direction, because a display signal line pattern 3 is also formed on the same first substrate 10, the pattern layout becomes complex. For this reason, gate bus lines are laminated, and there is a tendency to interlayer shorting, and a reduction of the yield.

In contrast, in the first embodiment, even if sub-pixels of the same luminance region are disposed along the row direction, the lengths of patterns connecting the sub-pixels with the reference potential trunk lines are the same for each sub-pixel. For this reason, it is possible, without a reduction in the numerical aperture, to perform a layout that is equivalent to that of a conventional multipixel method (MPD) that has a plurality of pixels, and further possible to greatly reduce the frequency of occurrence of interlayer shorting. Additionally, as shown in FIG. 6, although the laminated part of the switching elements (TFT parts) remains, the TFT part, in contrast to the gate bus line laminated part, is easy to repair by isolation if a problem occurs, this being an advantage in terms of the ultimate yield.

Figure 6:
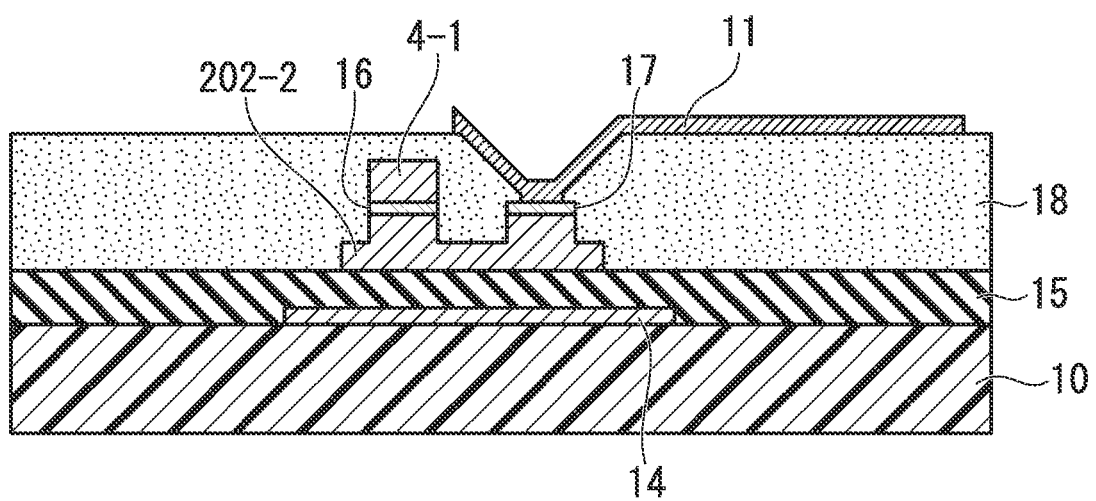
FIG. 6 is a drawing describing one example of a cross-sectional view of the first substrate 10 according to the same embodiment.

FIG. 6 is a drawing describing one example of a cross-sectional view of the first substrate 10 in the present embodiment.

As shown in FIG. 6, a gate electrode 14 is formed over a partial region of the first substrate 10. A gate insulating film 15 is formed so as to cover the first substrate 10 and the gate electrode 14. A connecting part 202-2 made of a-Si is formed over a partial region of the gate insulating film 15. Connecting parts 16 and 17 made of n+a-Si are formed over a partial region of the connecting part 202-2. The first reference potential trunk line 4-1 is formed over the connecting part 16. A protective film 18 is formed to cover the gate insulating film 15, the connecting part 202-2, the connecting part 16, and the first reference potential trunk line 4-1. A display electrode 11 is formed over a partial region of the protective film 18 so as to cover the connecting part 17.

In FIG. 6, the first reference potential trunk line 4-1 also functions as a source electrode and a reference signal line. In FIG. 6, the display electrode 11 also functions as a drain electrode and a pixel electrode.

In FIG. 5A and FIG. 5B, the plus sign "+" indicates that a positive potential is applied from the display signal lines 3-1 to 3-2 in the Lth frame. The minus sign "−" indicates that a negative potential is applied from the display signal lines 3-1 to 3-3 in the Lth frame. As shown in FIG. 2, FIG. 5A, and FIG. 5B, the disposition in which the sub-pixel 111 (201-1) is connected to the first reference potential trunk line 4-1 and the sub-pixel 112 (201-2) is connected to the second reference potential trunk line 4-2 is indicated as A. The disposition in which the sub-pixel 113 (201-3) is connected to the second reference potential trunk line 4-2 and the sub-pixel 114 (201-4) is connected to the first reference potential trunk line 4-1 is indicated as B. In this case, the disposition is a repetition of a prescribed pattern, such as ABAB . . . .

As described above, in the first embodiment, the constitution is an opposing matrix constitution in which the display signal lines 3-1 to 3-3 are disposed on the second substrate 20, and the scanning lines 5-1 to 5-2, the reference potential trunk lines 4-1 to 4-2, the display electrodes 11, which are connected to the sub-pixels, and the switching elements 2, which are connected to the electrodes, are disposed on the first substrate 10. The source terminal of the switching element 2-1 connected to the liquid crystal capacitance 1-1 of the sub-pixel 111 and the source terminal of the switching element 2-4 connected to the liquid crystal capacitance 1-4 of the sub-pixel 114 are connected to the first reference potential trunk line 4-1. The source terminal of the switching element 2-2 connected to the liquid crystal capacitance 1-2 of the sub-pixel 112 and the source terminal of the switching element 2-3 connected to the liquid crystal capacitance 1-3 of the sub-pixel 113 are connected to the second reference potential trunk line 4-2. Additionally, the controller 12 switches the polarity of the potential on the display signal lines 3-1 to 3-3 for each dot, and switches the polarity of the potential on the display signal lines 3-1 to 3-3 for each frame and switches the potential on the reference potential trunk lines 4-1 to 4-2 for each frame. By doing this, it is possible to achieve a liquid crystal display device having a disposition that eliminates the alternating disposition of sub-pixels of different luminances, thereby enabling smooth rendering of a half-tone display.

In a conventional opposing matrix display proposed in the past, because the constitution makes supplementary capacitance impossible, multipixel implementation is difficult with conventional art, and a method for implementing it has not been disclosed. By applying the present embodiment, in the multipixel constitution using an opposing matrix display, the polarity of the potential on the display signal lines 3-1 to 3-3 is switched for each dot, the polarity of the potential on the display signal lines 3-1 to 3-3 is switched for each frame, and the potentials on the first reference potential trunk line 4-1 and the second reference potential trunk line 4-2 are switched for each frame, without forming supplementary capacitances. As a result, because there is no lamination of the display signal lines with the scanning lines, compared with a liquid crystal display device having a one-layer constitution other than an opposing matrix constitution, interlayer shorting does not occur, and yield is good.

[Second Embodiment]

Figure 7:
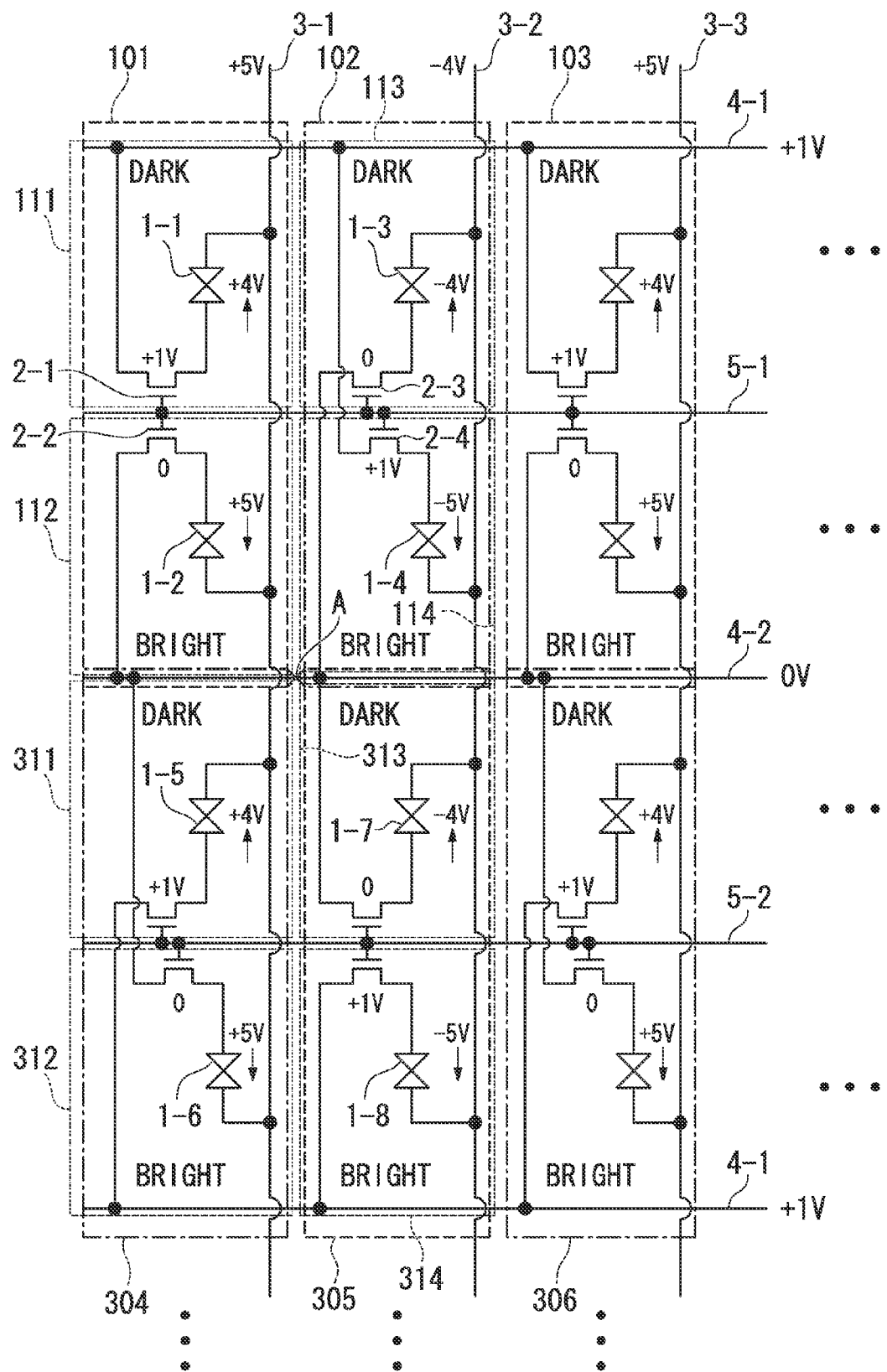
FIG. 7 is an equivalent circuit diagram describing the operation of the liquid crystal display device according to a second embodiment.
Figure 8:
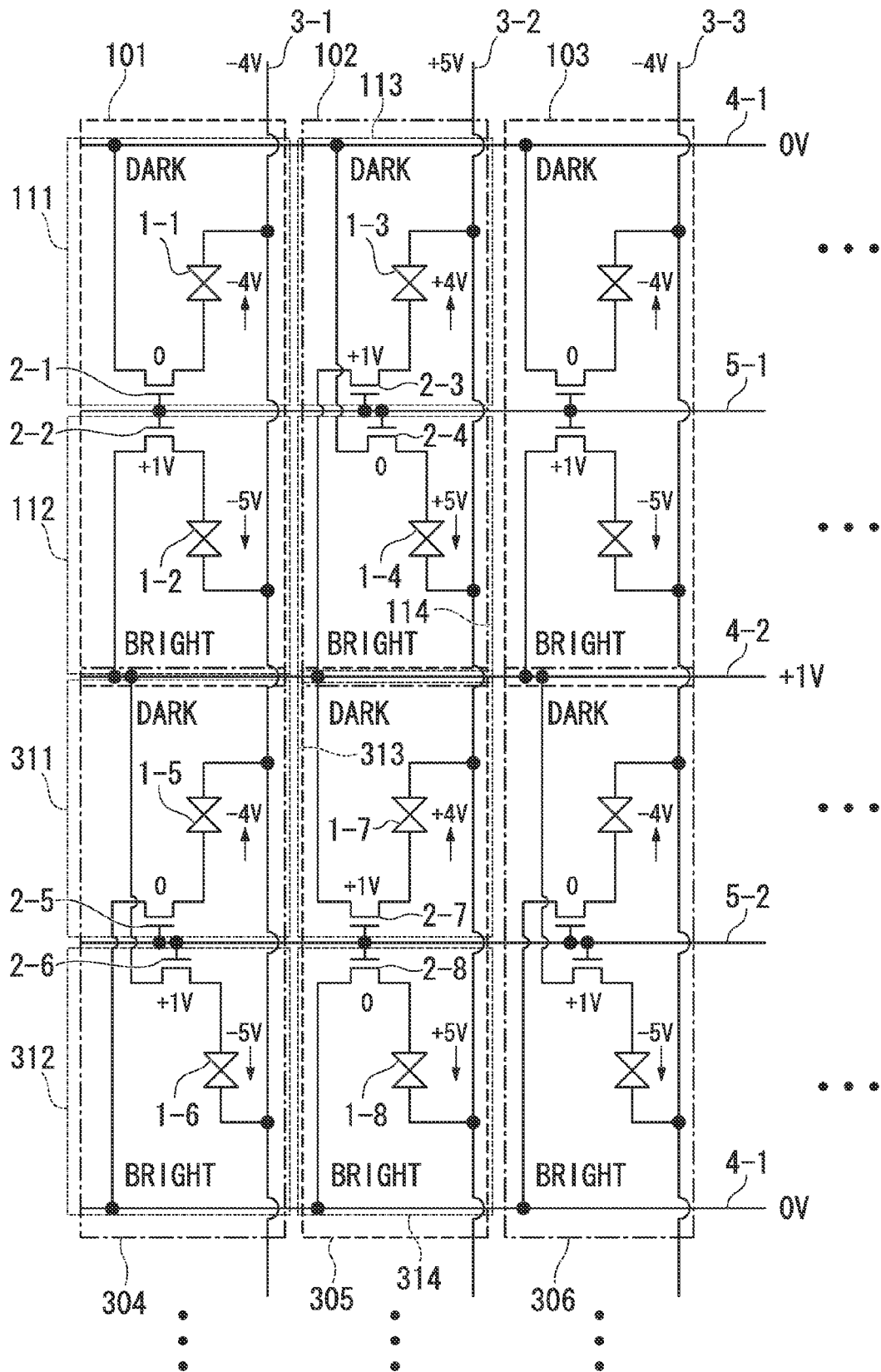
FIG. 8 is an equivalent circuit diagram describing another operation of the liquid crystal display device according to the same embodiment.

FIG. 7 and FIG. 8 are equivalent circuit diagrams that describe the operation of the liquid crystal display device according to the second embodiment.

Figure 9:
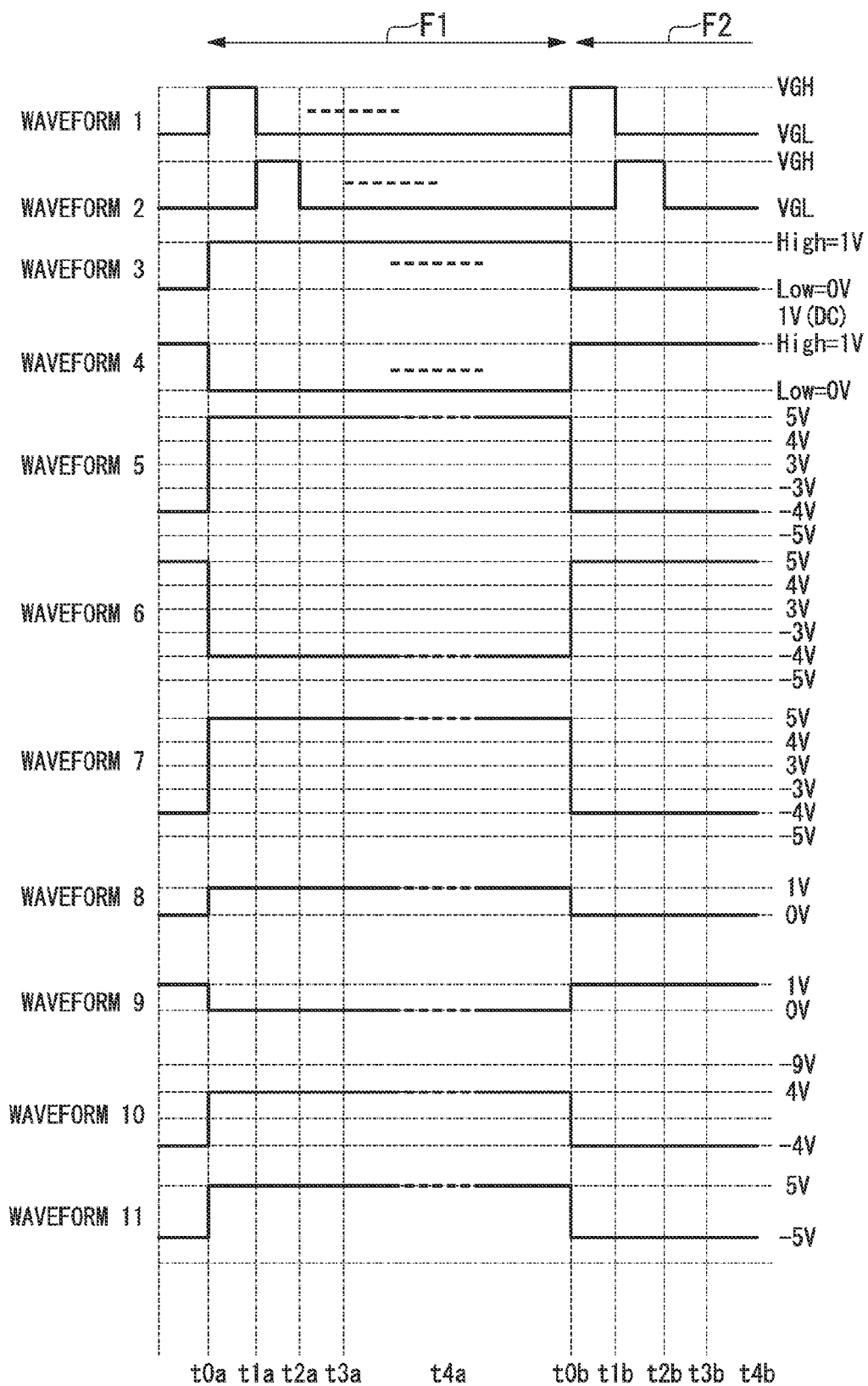
FIG. 9 is a timing diagram of a liquid crystal display device at the Lth frame and at the (L+1)th frame according to the same embodiment.

FIG. 7 and FIG. 8 show the conditions for each frame. FIG. 9 is a timing diagram of the liquid crystal display device at the Lth frame and the (L+1)th frame in the second embodiment. The differences with respect to the first embodiment are the pixels 304 to 306 and the potentials on the display signal lines 3-1 to 3-3.

In the first embodiment, the potentials on the display signal lines 3-1 to 3-3 are switches for each dot. In the second embodiment, however, the polarity is fixed at an interval of one display signal line for each frame. That is, the second embodiment is the example of frame-inversion drive, in which control is done so that the potentials applied to the display signal lines 3-1 to 3-3 are switched in polarity for each frame line.

As shown in FIG. 7, the pixel 101 and the pixel 102 are disposed so as to be adjacent in the row direction. The pixel 101 has, with respect to the column direction, the sub-pixel (first sub-pixel) 111 and the sub-pixel (second sub-pixel) 112 disposed in that sequence. The pixel 102 has, with respect to the column direction, the sub-pixel (third sub-pixel) 113 and the sub-pixel (fourth sub-pixel) 114 disposed in that sequence. The pixel 304 and the pixel 305, which are disposed so as to be adjacent in the row direction, are disposed in point symmetry with the pixel 101 and the pixel 102, with respect to point A of the second reference potential trunk line 4-2. The pixel 305 has, with respect to the column direction, the sub-pixel (first sub-pixel) 314 and the sub-pixel (second sub-pixel) 313 disposed in that sequence. The pixel 304 has, with respect to the column direction, the sub-pixel (third sub-pixel) 312 and the sub-pixel (fourth sub-pixel) 311 disposed in that sequence.

In FIG. 9, the horizontal axis represents time, and the vertical axis represents electrical potential. The waveform 1 in FIG. 9 shows the time variations of the potential on the scanning line 5-1. The waveform 2 in FIG. 9 shows the time variations of the potential on the scanning line 5-2. The waveform 3 in FIG. 9 shows the time variations of the potential on the first reference potential trunk line 4-1. The waveform 4 in FIG. 9 shows the time variations of the potential on the second reference potential trunk line 4-2. The waveform 5 in FIG. 9 shows the time variations of the potential on the display signal line 3-1. The waveform 6 in FIG. 9 shows the time variations of the potential on the display signal line 3-2. The waveform 7 in FIG. 9 shows the time variations of the potential on the display signal line 3-3. The waveform 8 in FIG. 9 shows the time variations of the potential on the node 1. The waveform 9 in FIG. 9 shows the time variations of the potential on the node 2. The waveform 10 in FIG. 9 shows the time variations of the potential between the display signal line 3-1 and the node 1 (voltage applied to the liquid crystal capacitance of the first sub-pixel). The waveform 11 in FIG. 9 shows the time variations of the potential between the display signal line 3-1 and the node 2 (voltage applied to the liquid crystal element of the second sub-pixel).

First, the operation at the time of the Lth frame (first frame F1 in FIG. 9) will be described. A potential of +1 V is applied to the first reference potential trunk line 4-1 (time t0a in waveform 3 of FIG. 9). A potential of 0 V is applied to the second reference potential trunk line 4-2 (time t0a in waveform 4 of FIG. 9). A signal having a potential of −4 V to +5V is supplied to the display signal line 3-1 and to the display signal line 3-3 (time t0a in the waveform 5 and the waveform 7 of FIG. 9). A signal having a potential of +5 V to −4 V is supplied to the display signal line 3-2 (time t0a in the waveform 6 of FIG. 9). In the following, the operation of each pixel for the case in which the maximum potential signal is supplied to the display signal lines 3-1 to 3-3 will be described. For this reason, because operation of each sub-pixel of the pixels 101 to 103 and the potential difference on the liquid crystal capacitance 1 corresponding to each pixel are the same as in the first embodiment, the descriptions thereof are omitted herein.

Next, the operation of the pixels 304 to 306 will be described. The potentials on the display signal lines 3-1 to 3-3 associated with each of the sub-pixels of the pixels 304 to 306 are supplied as the same potentials as for the pixels 101 to 103 (time t1a in the waveforms 5 to 7 in FIG. 9). For this reason, the potential difference between +5 V of the display signal line 3-1 and +1V of the first reference potential trunk line 4-1, this being +4 V, is generated at the liquid crystal capacitance 1-5 of the sub-pixel 311 of the pixel 304. In the same manner, the potential difference between +5 V on the display signal line 3-1 and 0 V on the second reference potential trunk line 4-2, this being +5V, is generated at the liquid crystal capacitance 1-6 of the sub-pixel 312. As a result, the sub-pixel 312, having a large potential difference, is displayed with a higher luminance than the sub-pixel 311, the sub-pixel 311 being displayed dark, and the sub-pixel 312 being displayed bright. Because the constitution of the pixel 306 is the same as that of the pixel 304, it operates in the same manner as the pixel 304.

Additionally, the potential difference between −4 V on the display signal line 3-2 and 0 V on the second reference potential trunk line 4-2, this being −4 V, is generated at the liquid crystal capacitance 1-7 of the sub-pixel 313 of the pixel 305. In the same manner, the potential difference between −4 V on the display signal line 3-2 and +1 V on the first reference potential trunk line 4-1, this being −5 V, is generated at the liquid crystal capacitance 1-8 of the sub-pixel 314. As a result, the sub-pixel 314, having a large potential difference, is displayed with a higher luminance than the sub-pixel 313, the sub-pixel 313 being displayed dark, and the sub-pixel 314 being displayed bright.

Next, the operation at the (L+1)th frame (second frame F2 in FIG. 9) will be described. The controller 12, during the vertical return interval (at time t0b in waveforms 5 and 7 in FIG. 9), switches the polarity of the potentials on the display signal lines 3-1 to 3-3 to a polarity that is the reverse of the polarity in the Lth frame (first frame F1 in FIG. 9). Additionally, the controller 12 switches the potential on the first reference potential trunk line 4-1 from +1 V to 0 V (time t0b in waveform 3 in FIG. 9) and switches the potential on the second reference potential trunk line 4-2 from 0 V to +1V (time t0b in waveform 4 in FIG. 9). As a result, 0 V is applied to the first reference potential trunk line 4-1 (time t0b in waveform 3 in FIG. 9) and +1 V is applied to the second reference potential trunk line 4-2 (time t0b in waveform 4 in FIG. 9). Also, a signal of a potential of +5 V to −4 V is supplied to the display signal line 3-1 and the display signal line 3-3 (time t0b in waveform 5 in FIG. 9), a signal of a potential of −4 V to +5 V is supplied to the display signal line 3-2 (time t0b in waveform 6 in FIG. 9). The operation of each pixel is described below for the case in which a maximum potential signal is supplied to the display signal lines 3-1 to 3-3. For this reason, because operation of each sub-pixel of the pixels 101 to 103 and the potential difference on the liquid crystal capacitance 1 corresponding to each pixel are the same as in the first embodiment, the descriptions thereof are omitted herein.

Next, the operation of the pixels 304 to 306 will be described. The potentials on the data lines 3-1 to 3-3 associated with each of the sub-pixels of the pixels 304 to 306 are applied as the same potentials as for the pixels 101 to 103 (time t1b in the waveforms 5 to 7 in FIG. 9). For this reason, the potential difference between −4 V of the display signal line 3-1 and 0 V of the first reference potential trunk line 4-1, this being −4 V, is generated at the liquid crystal capacitance 1-5 of the sub-pixel 311 of the pixel 304. In the same manner, the potential difference between −4 V on the display signal line 3-1 and +1 V on the second reference potential trunk line 4-2, this being −5 V, is generated at the liquid crystal capacitance 1-6 of the sub-pixel 312. As a result, the sub-pixel 312, having a large potential difference, is displayed with a higher luminance than the sub-pixel 311, the sub-pixel 311 being displayed dark, and the sub-pixel 312 being displayed bright. Because the constitution of the pixel 306 is the same as that of the pixel 304, it operates in the same manner as the pixel 304.

Additionally, the potential difference between +5 V on the display signal line 3-2 and +1 V on the second reference potential trunk line 4-2, this being +4 V, is generated at the liquid crystal capacitance 1-7 of the sub-pixel 313 of the pixel 3-5. In the same manner, the potential difference between +5 V on the display signal line 3-2 and 0 V on the first reference potential trunk line 4-1, this being +5 V, is generated at the liquid crystal capacitance 1-8 of the sub-pixel 314. As a result, the sub-pixel 314, having a large potential difference, is displayed with a higher luminance than the sub-pixel 313, the sub-pixel 313 being displayed dark, and the sub-pixel 314 being displayed bright.

Therefore, as shown in FIG. 7 and FIG. 8, sub-pixels all having dark luminance are arranged in the first and third rows of the matrix, and pixels all having bright luminance are arranged and displayed in the second and fourth rows of the matrix. Similar to the first embodiment, even with a disposition in which sub-pixels of the same luminance region are disposed so as to be adjacent in the row direction, as in this case, the bright/dark disposition of each sub-pixel does not change for each frame. For this reason, even in an image with distinct edge it is possible to achieve a smooth display.

Figure 10:
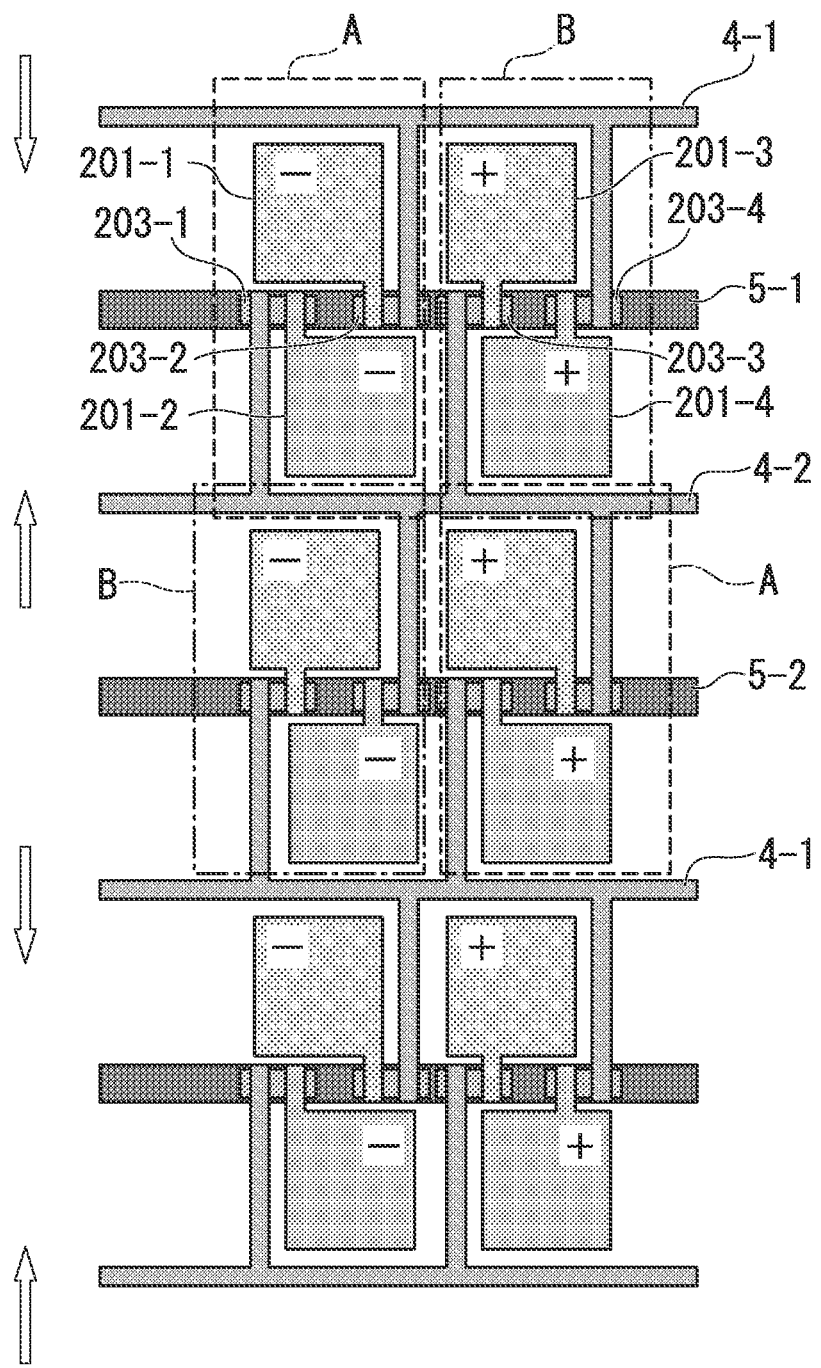
FIG. 10 is a drawing describing a layout example on the first substrate 10 according to the same embodiment.

FIG. 10 is a drawing that describes an example of the layout on the first substrate 10 in the second embodiment. In FIG. 10, the sub-pixels (switching elements 2 and display electrodes 11) 201-1 to 201-4 are connected to the reference potential trunk lines via the connecting parts 203-1 to 203-3. Similar to the case of FIG. 5A and FIG. 5B, the transparent electrode 13, to which the display signal lines 3-1 to 3-3 are connected is over the opposing second substrate 20. For this reason, the reference potential trunk lines 41- to 4-3 and scanning lines 5-1 to 5-2, and the switching elements 2 and display electrodes 11 are formed on the first substrate 10.

In this manner, in the second embodiment as well, even if sub-pixels of the same luminance region are arranged in the row direction, the length of the patterns connecting each of the sub-pixels and each of the reference potential trunk lines are the same for each of the sub-pixels. For this reason, it is possible, without a reduction in the numerical aperture, to perform a layout that is equivalent to that of a conventional multipixel method (MPD) that has a plurality of pixels.

Also, in FIG. 10, the plus sign "+" indicates that a positive potential is applied from the display signal lines 3 in the Lth frame, and the minus sign "−" indicates that a negative potential is applied from the display signal lines 3 in the Lth frame.

Also, although FIG. 10 describes the example of a layout in which each reference potential trunk line is connected to each sub-pixel, it is also possible, as shown in FIG. 5B to have a layout in which interconnect of groups of two adjacent sub-pixels are connected to each of the reference potential trunk lines. In this case, it is possible to further improve the numerical aperture.

As noted above, the constitution of the second embodiment is an opposing matrix constitution. The source terminal of the switching element 2-1 connected to the liquid crystal capacitance 1-1 of the sub-pixel 111 and the source terminal of the switching element 2-4 connected to the liquid crystal capacitance 1-4 of the sub-pixel 114 are connected to the first reference potential trunk line 4-1. The source terminal of the switching element 2-2 connected to the liquid crystal capacitance 1-2 of the sub-pixel 112 and the source terminal of the switching element 2-3 connected to the liquid crystal capacitance 1-3 of the sub-pixel 113 are connected to the second reference potential trunk line 4-2. Additionally, the controller 12 switches the polarity of the potential on the display signal lines 3-1 to 3-3 and the reference potential trunk lines 4-1 to 4-2 for each frame. For this reason, it is possible to achieve a liquid crystal display device having a disposition that eliminates the alternating disposition of sub-pixels of different luminances, thereby enabling smooth rendering of a half-tone display.

[Third Embodiment]

The third embodiment will be described, using FIG. 11 to FIG. 15.

Figure 11:
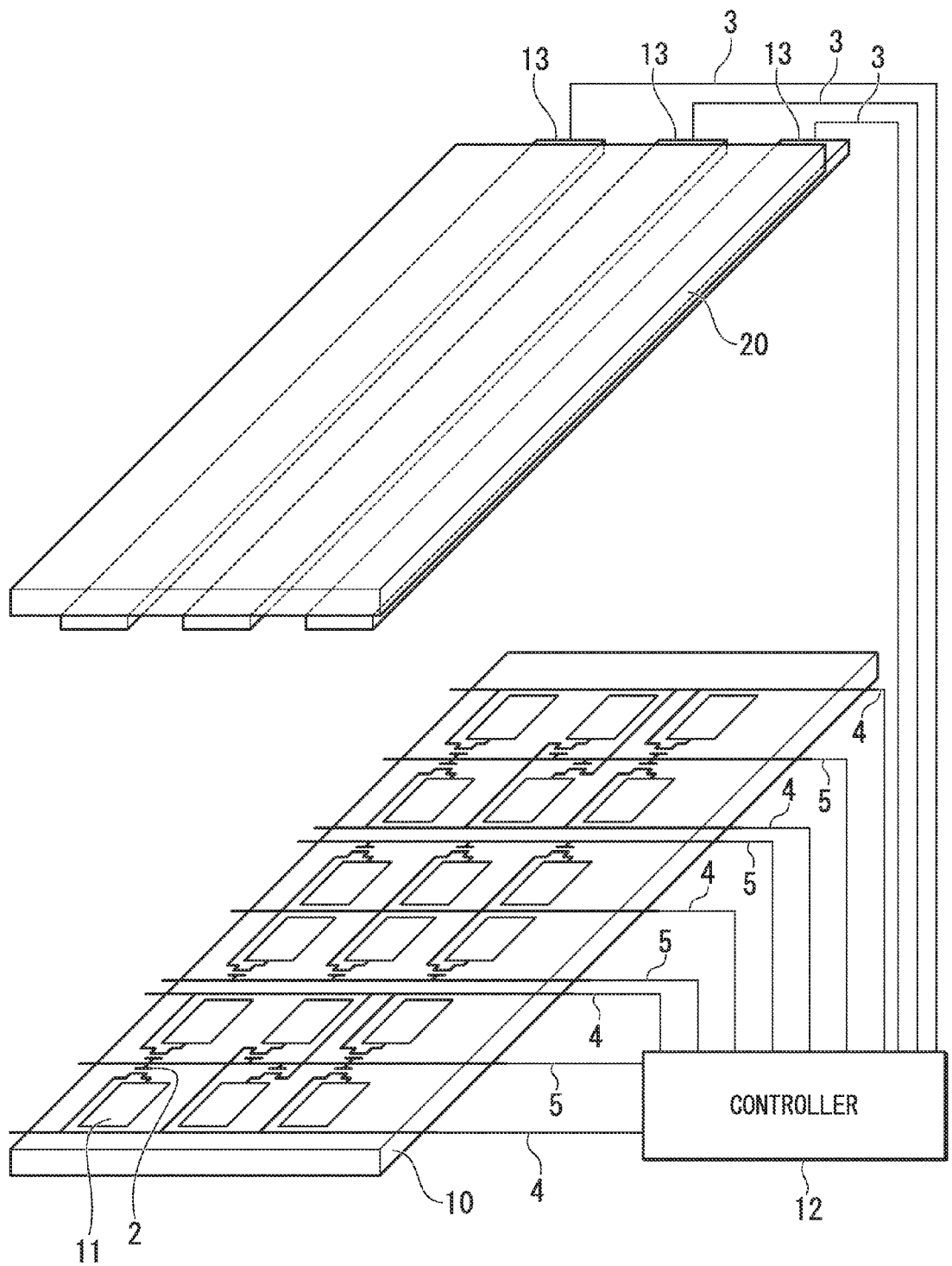
FIG. 11 is an oblique view showing one example of a liquid crystal display device according to a third embodiment.

FIG. 11 is an oblique view showing one example of a liquid crystal display device according to the third embodiment. Similar to the case of the first embodiment, this liquid crystal display device has a first substrate 10, a second substrate 20, and a controller 12. The first substrate 10 has a plurality of switching elements 2 implemented by TFTs (thin-film transistors), a plurality of reference potential trunk lines 4, a plurality of scanning lines 5, and a plurality of display electrodes 11.

Additionally, the second substrate 20 has a plurality of display signal lines 3. The difference with respect to the first embodiment is that the liquid crystal display device is constituted so that one pixel is divided into three sub-pixels. Also, in the third embodiment, the description is for the example of line-inversion drive.

Figure 12:
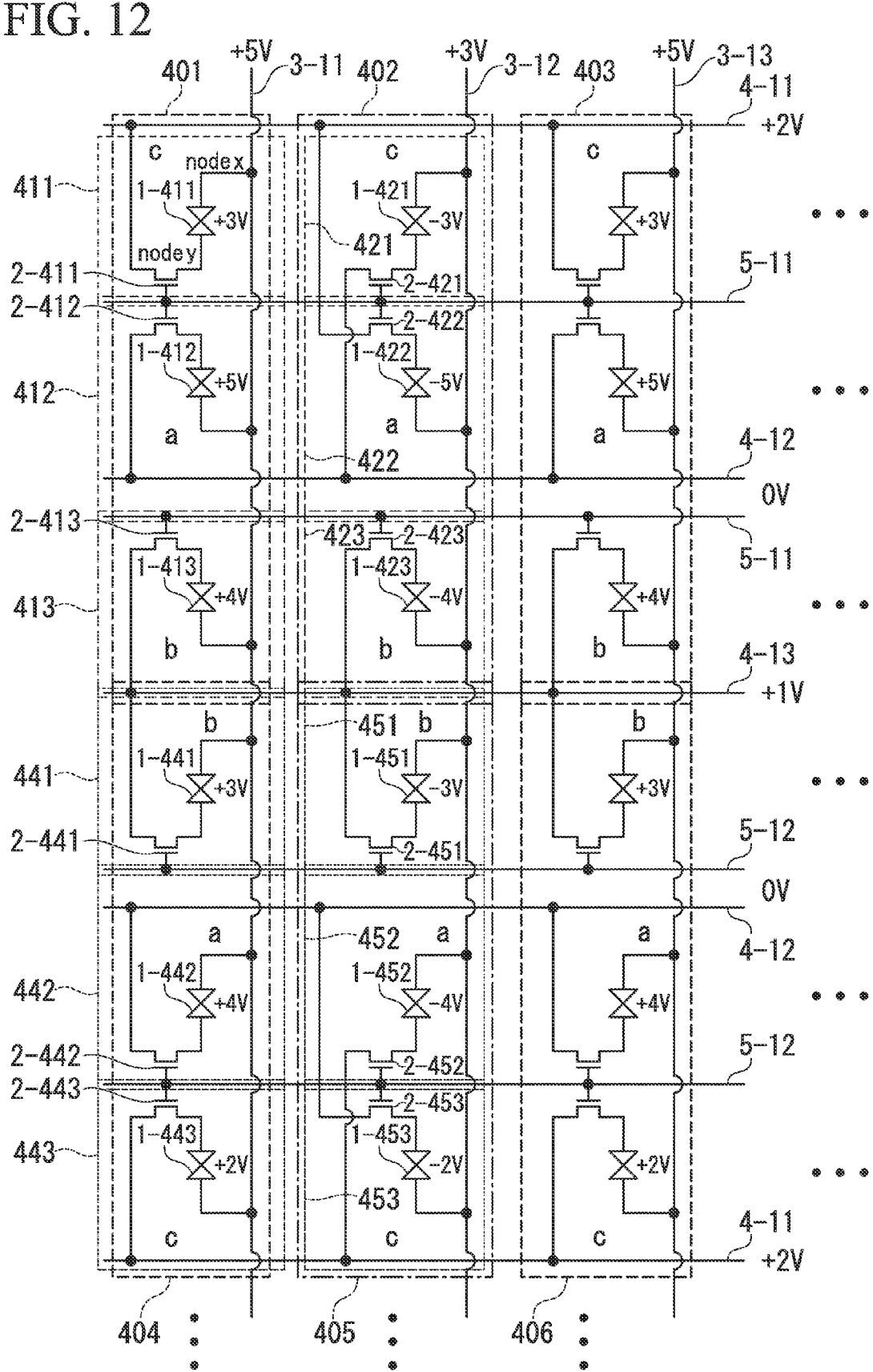
FIG. 12 is an equivalent circuit diagram describing the operation of the liquid crystal display device according to the same embodiment.
Figure 13:
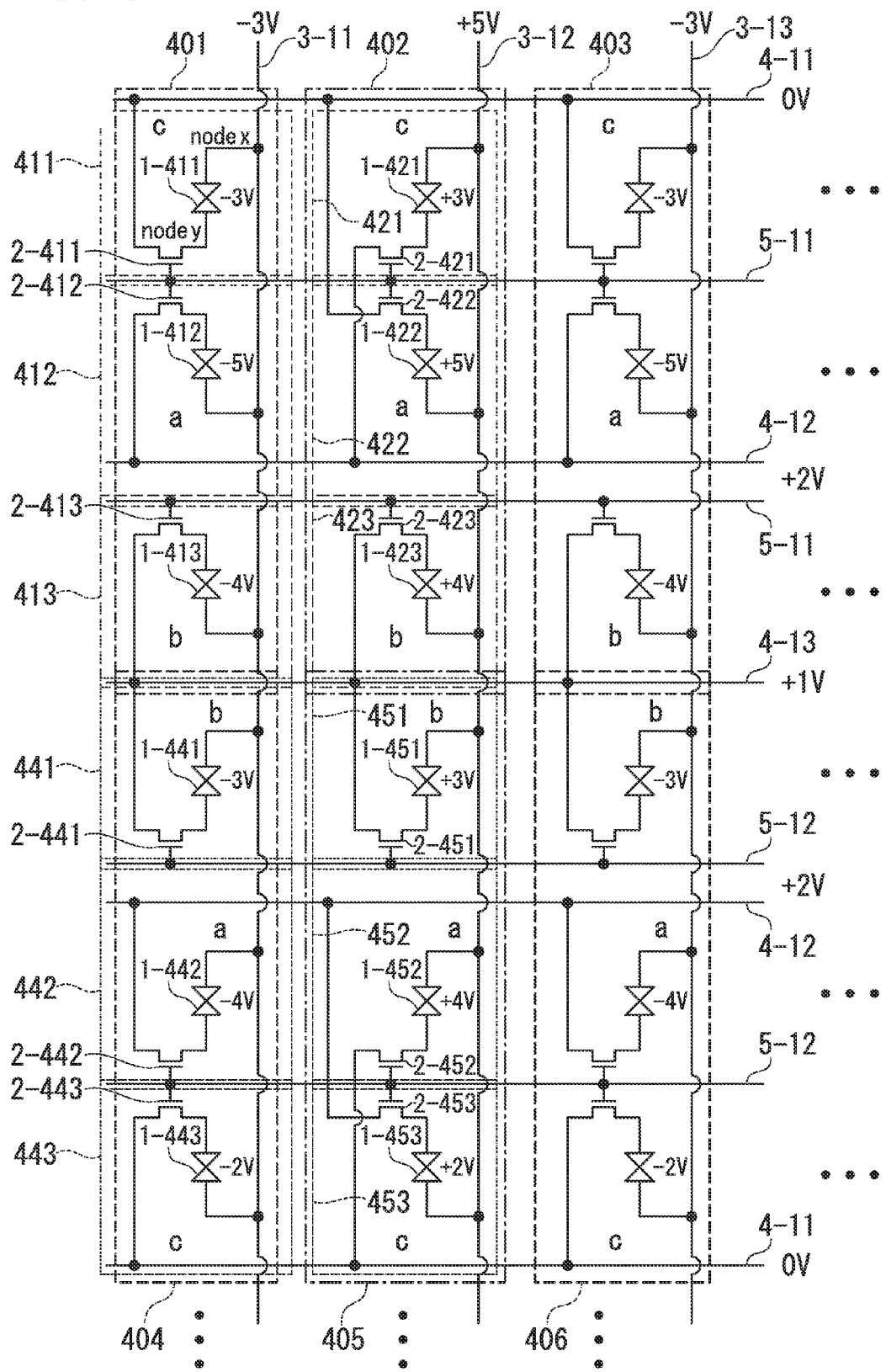
FIG. 13 is an equivalent circuit diagram describing another operation of the liquid crystal display device according to the same embodiment.
Figure 14:
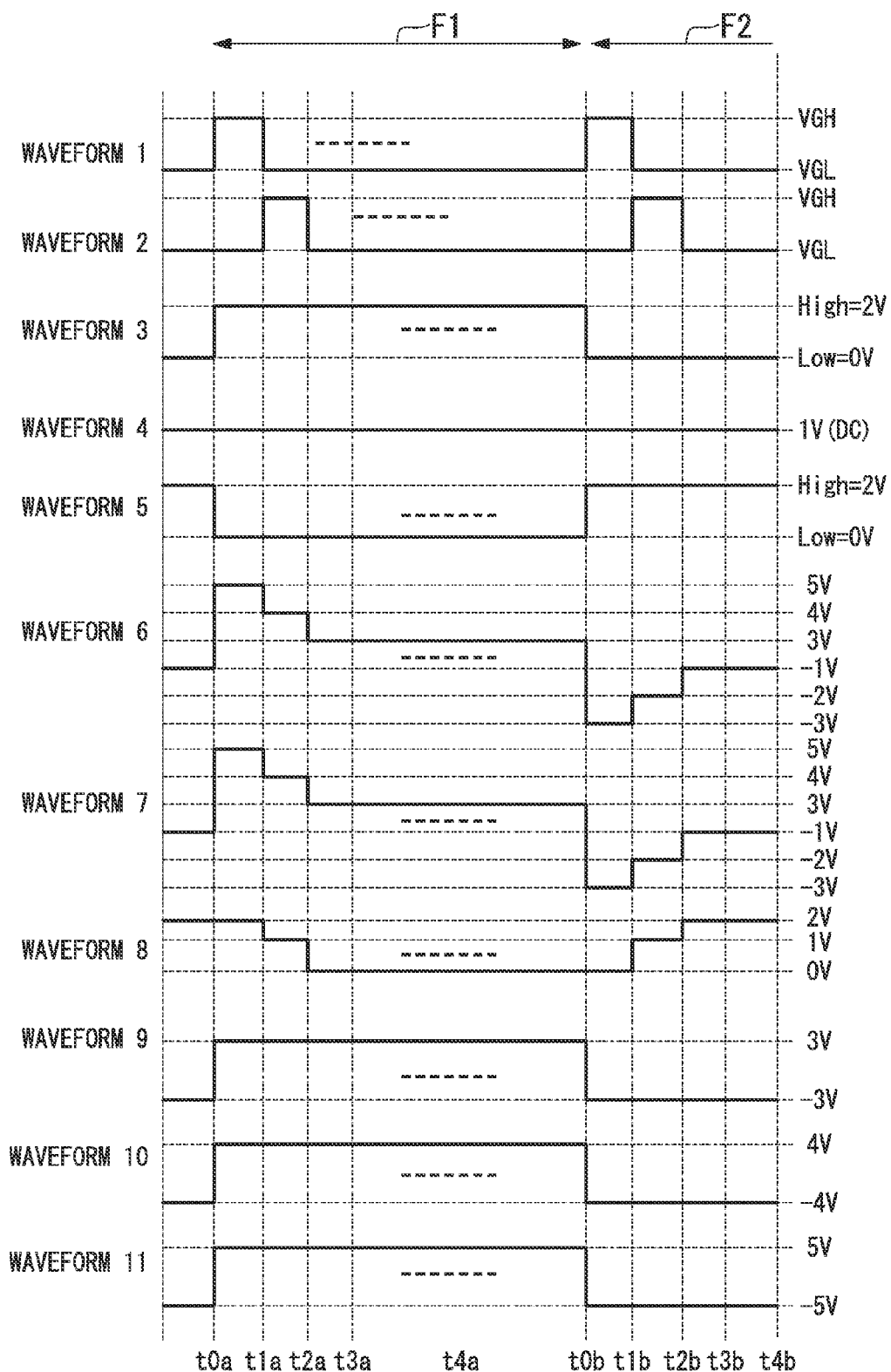
FIG. 14 is a timing diagram of the liquid crystal display device at the Lth frame and at the (L+1)th frame according to the same embodiment.
Figure 15:
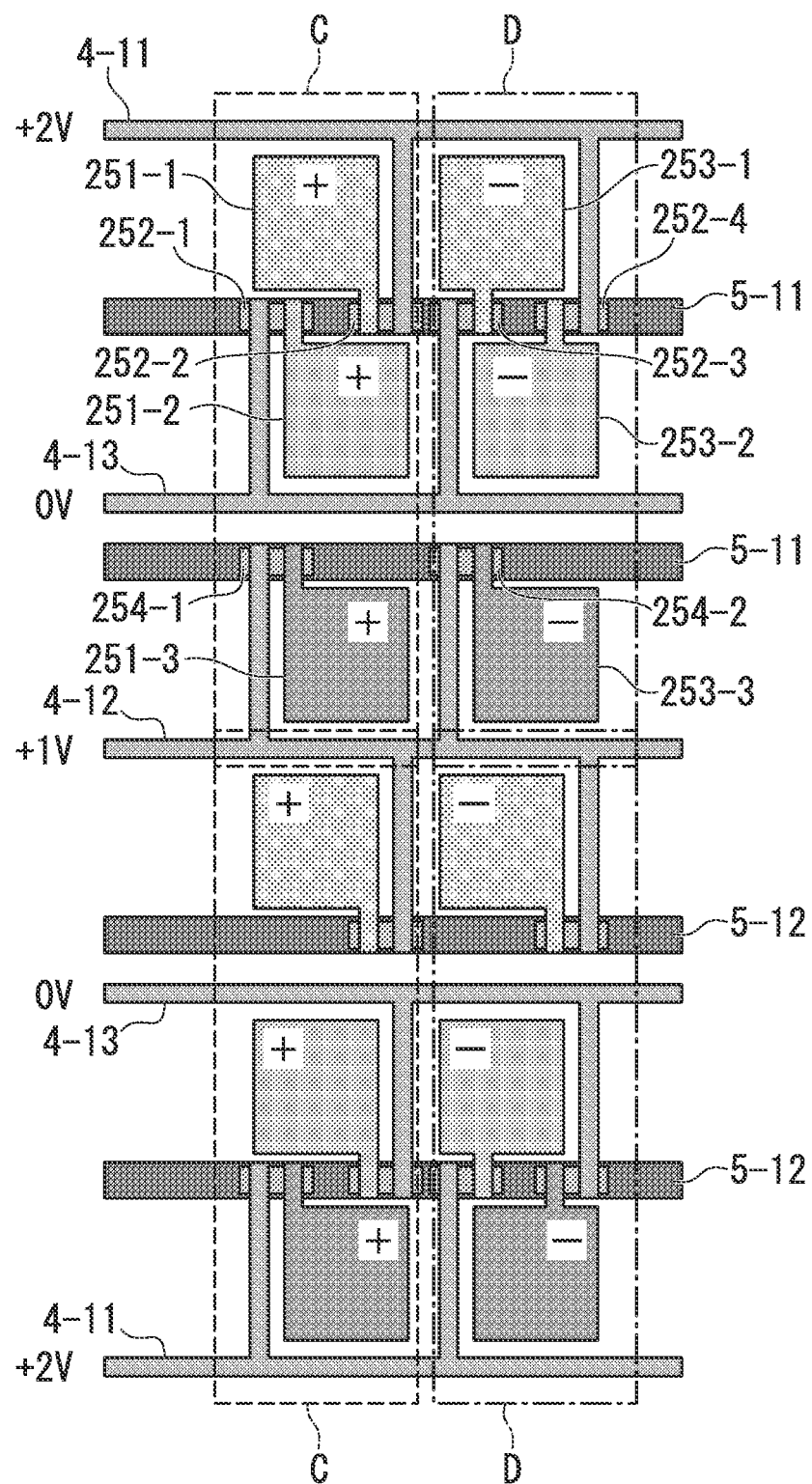
FIG. 15 is a drawing describing a layout example on the first substrate 10 according to the same embodiment.

FIG. 12 and FIG. 13 are equivalent circuit diagrams that describe the operation of the liquid crystal display device according to the third embodiment. FIG. 14 and FIG. 15 show the condition for each frame. FIG. 14 is a timing diagram of the liquid crystal display device at the Lth frame and the (L+1)th frame.

As shown in FIG. 12, the liquid crystal display device according to the third embodiment has pixels 401 to 406. Each pixel further has three divided sub-pixels. The pixel 401 and the pixel 402 are disposed so as to be adjacent in the row direction. The pixel 401 has, with respect to the column direction, a sub-pixel (first sub-pixel) 411, a sub-pixel (second sub-pixel) 412, and a sub-pixel (fifth sub-pixel) 413 disposed in that sequence. The pixel 402 has, with respect to the column direction, a sub-pixel (third sub-pixel) 421, a sub-pixel (fourth sub-pixel) 422, and a sub-pixel (sixth sub-pixel) 423 disposed in that sequence. The pixel 404 and the pixel 405, which are disposed so as to be adjacent in the row direction, are disposed in linear symmetry with the pixel 401 and the pixel 402, with respect to the third reference potential trunk line 4-13. The pixel 404 has, with respect to the column direction, a sub-pixel (first sub-pixel) 443, a sub-pixel (second sub-pixel) 442, and a sub-pixel (fifth sub-pixel) 441 disposed in that sequence. The pixel 405 has, with respect to the column direction, a sub-pixel (third sub-pixel) 453, a sub-pixel (fourth sub-pixel) 452, and a sub-pixel (sixth sub-pixel) 451 disposed in that sequence.

Additionally, each sub-pixel has an associated liquid crystal capacitance 1, switching elements 2, and a display electrode 11. As an example, the sub-pixel 411 has a liquid crystal capacitance 1-411 and a switching element 2-411. The sub-pixel 412 has a liquid crystal capacitance 1-412 and a switching element 2-412. The sub-pixel 413 has a liquid crystal capacitance 1-413 and a switching element 2-413.

The sub-pixel 411 of the pixel 401 is connected to the first reference potential trunk line 4-11 via the switching element 2-411. The sub-pixel 412 is connected to the second reference potential trunk line 4-12 via the switching element 2-412. The sub-pixel 413 is connected to the third reference potential trunk line 4-13 via the switching element 2-413. Also, the liquid crystal capacitances 1-411 to 1-413 of each of the sub-pixels 411 to 413 are connected to the display signal line 3-11.

Additionally, the sub-pixel 421 of the pixel 402 is connected to the second reference potential trunk line 4-12 via the switching element 2-421. The sub-pixel 422 is connected to the first reference potential trunk line 4-11 via the switching element 2-422. The sub-pixel 423 is connected to the third reference potential trunk line 4-13 via the switching element 2-423. Also, the liquid crystal capacitances 1-421 to 1-423 of each of the sub-pixels 421 to 423 are connected to the display signal line 3-12.

In FIG. 14, the horizontal axis represents time, and the vertical axis represents electrical potential. The waveform 1 in FIG. 14 shows the time variations of the potential on the scanning line 5-11. The waveform 2 in FIG. 14 shows the time variations of the potential on the scanning line 5-12. The waveform 3 in FIG. 14 shows the time variations of the potential on the first reference potential trunk line 4-11. The waveform 4 in FIG. 14 shows the time variations of the potential on the third reference potential trunk line 4-13. The waveform 5 in FIG. 14 shows the time variations of the potential on the second reference potential trunk line 4-12. The waveform 6 in FIG. 14 shows the time variations of the potential on the display signal line 3-11. The waveform 7 in FIG. 14 shows the time variations of the potential on the node x. The waveform 8 in FIG. 14 shows the time variations of the potential on the node y. The waveform 9 in FIG. 14 shows the time variations of the potential between the node x and the node y (voltage applied to the liquid crystal element of the first sub-pixel). The waveform 10 in FIG. 14 shows the voltage applied to the liquid crystal element of the second sub-pixel. The waveform 11 in FIG. 14 shows the voltage applied to liquid crystal element of the third sub-pixel.

In FIG. 14 shows the case in which the Lth frame is the first frame (1st-frame) F1, and the (L+1)th frame is the second frame (2nd-frame) F2.

The operation at the Lth frame will be described, using FIG. 12 and FIG. 14. A potential of +2 V is applied to the first reference potential trunk line 4-11 (time t0$a$ in the waveform 3 of FIG. 14), 0 V is applied to the second reference potential trunk line 4-12 (time t0$a$ in the waveform 4 of FIG. 14), and 1 V is applied to the third reference potential trunk line 4-13 (time t0$a$ in the waveform 5 of FIG. 14). That is, the potential on the third reference potential trunk line 4-13 is an intermediate value between the first reference potential trunk line 4-11 and the second reference potential trunk line 4-12. Also, as shown in FIG. 14, at the Lth frame, the controller 12 controls the signals on the display signal line 3-11 and the display signal line 3-13 to +5 V (time t0$a$ to t1$a$ in the waveform 6 of FIG. 14), +4 V (time t1$a$ to t2$a$ in waveform 6 of FIG. 14), and +3 V (time t2$a$ in waveform 6 of FIG. 14). Also, at the (L+1)th frame, the controller 12 controls to −3 V (time t0$b$ to t1$b$ in waveform 6 of FIG. 14), −2 V (time t1$b$ to t2$b$ in waveform 6 of FIG. 14), and −1 V (time t2$b$ in waveform 6 of FIG. 14). That is, in the first embodiment and the second embodiment, the example of operation with the signal on the display signal line 3 being the maximum value was described, whereas the third embodiment is the display example for the case in which the signals on the display signal line 3-11 and the display signal line 3-13 are +5 V with respect to pixels on the first row, +4 V with respect to pixels on the second row, and +3 V with respect to pixels on and after the third row. The range of the various signals on each of the display signal lines 3-11 to 3-13 is, for example, a potential of +5 V to +2 V on the positive polarity side and −4 V to −1 V on the negative polarity side.

Additionally, the controller 12, at the Lth frame, controls the potential on the display signal line 3-12 to −3 V (time t0$a$ to t1$a$), −2 V (time t1$a$ to t2$a$), and −1 V (time t2$a$) for each dot, and, at the (L+1)th frame, controls to +5 V (time t0$b$ to t1$b$), +4 V (time t1$b$ to t2$b$), and +3 V (time t2$b$) for each dot.

The potential difference between +5 V on the display signal line 3-11 and +2 V on the first reference potential trunk line 4-11, this being +3 V, is generated at the liquid crystal capacitance 1-411 of the sub-pixel 411 of the pixel 401. In the same manner, the potential difference between +5 V of the display signal line 3-11 and 0 V of the second reference potential trunk line 4-12, this being +5 V, is generated at the liquid crystal capacitance 1-412 of the sub-pixel 412. In the same manner, the potential difference between +5 V of the display signal line 3-11 and the +1 V of the third reference potential trunk line 4-13, this being +4 V, is generated at the liquid crystal capacitance 1-413 of the sub-pixel 413. As a result, the sequence of potential differences is sub-pixel 412 (+5

V)>sub-pixel 413 (+4 V)>sub-pixel 411 (+3 V). Also, the luminances of the sub-pixels 411 to 413 is, responsive to the potential differences, sub-pixel 412>sub-pixel 413>sub-pixel 411.

In FIG. 12 and FIG. 13, the symbols a, b, and c represent the sequence of luminances, which is the sequence a>b>c.

Additionally, the operation of each of the sub-pixels 431 to 433 of the pixel 403 is the same as each of the sub-pixels 411 to 413 of the pixel 401.

Next, the potential difference between −3 V of the display signal line 3-12 and 0 V of the second reference potential trunk line 4-12, this being −3 V, is generated at the liquid crystal capacitance 1-421 of the sub-pixel 421 of the pixel 402. Similarly, the potential difference between −3 V of the display signal line 3-12 and +2 V of the first reference potential trunk line 4-11, this being −5 V, is generated at the liquid crystal capacitance 1-422 of the sub-pixel 422. Similarly, the potential difference between −3 V of the display signal line 3-12 and +1 V of the third reference potential trunk line 4-13, this being −4 V, is generated at the liquid crystal capacitance 1-423 of the sub-pixel 423. As a result, the sequence of potential differences is sub-pixel 422 (−5 V)>sub-pixel 423 (−4 V)>sub-pixel 421 (−3 V). Also, the luminances, responsive to the potential differences, are in the sequence sub-pixel 422>sub-pixel 423>sub-pixel 421.

Each of the reference potential trunk lines, to which each of the switching element 2-441 to 2-443 of the pixel 404 are the same as the pixel 401. Additionally, the controller 12 controls the potentials on the display signal line 3-11 and the display signal line 3-13 to be +4 V and the potential on the display signal line 3-12 to be −2 V.

For this reason, the potential difference between +4 V of the display signal line 3-11 and +1 V on the third reference potential trunk line 4-13, this being +3 V, is generated at the liquid crystal capacitance 1-441 of the sub-pixel 441 of the pixel 404. Similarly, the potential difference between +4 V of the display signal line 3-11 and 0 V of the second reference potential trunk line 4-12, this being +4 V, is generated at the liquid crystal capacitance 1-442 of the sub-pixel 442. Similarly, the potential difference between +4 V of the display signal line 3-11 and +2 V of the first reference potential trunk line 4-11, this being +2 V, is generated at the liquid crystal capacitance 1-443 of the sub-pixel 443. As a result, the potential differences are in the sequence of sub-pixel 442 (+4 V)>sub-pixel 441 (+3 V)>sub-pixel 443 (+2 V). Also, the luminances of the sub-pixels 441 to 443, responsive to the potential differences, are in the sequence of sub-pixel 442>sub-pixel 441>sub-pixel 443.

Additionally, the operation of each of the sub-pixels 461 to 463 of the pixel 406 is the same as each of the sub-pixels 441 to 443 of the pixel 404.

Each of the reference potential trunk lines, to which the switching elements 2-451 to 2-453 of the pixel 405 are connected, are the same as the pixel 402.

For this reason, the potential difference between −2 V of the display signal line 3-12 and +1 V of the third reference potential trunk line 4-13, this being −3 V, is generated at the liquid crystal capacitance 1-453 of the sub-pixel 453 of the pixel 405. Similarly, the potential difference between −2 V of the display signal line 3-12 and +2 V of the first reference potential trunk line 4-12, this being −4 V, is generated at the liquid crystal capacitance 1-452 of the sub-pixel 452. Similarly, the potential difference between −2 V of the display signal line 3-12 and 0 V of the second reference potential trunk line 4-12, this being −2 V, is generated at the liquid crystal capacitance 1-453 of the sub-pixel 451. As a result, the potential differences are in the sequence of sub-pixel 452 (−4 V)>sub-pixel 451 (−3 V)>sub-pixel 453 (−2 V). Also, the luminances of the sub-pixels 451 to 453, responsive to the potential differences, are in the sequence sub-pixel 452>sub-pixel 451>sub-pixel 453.

Next, the operation at the (L+1)th frame will be described, using FIG. 13. The controller 12, during the vertical return interval, switches the polarity of the potentials on the display signal line 3-1 and the display signal line 3-3 to the reverse of the polarity at the Lth frame. As a result, as shown in FIG. 13, the controller 12 applies, from the display signal line 3-11 and the display signal line 3-13, −3 V to the pixel 401 and the pixel 403 (time t0b to t1b in waveform 6 of FIG. 14) and −2 V to the pixel 404 and the pixel 406 (time t1b to t2b in waveform 6 of FIG. 14). The controller 12 also applies, from the display signal line 3-12, +5 V to the pixel 402 (time t0b to t1b) and +4 V to the pixel 405 (time t0b to t1b). The controller 12 switches the potential on the first reference potential trunk line 4-11 from +2 V to 0 V (time t0b in waveform 3 of FIG. 14), and the potential on the second reference potential trunk line 4-12 from 0 V to +2 V (time t0b in waveform 5 of FIG. 14), and applies +1 V to the third reference potential trunk line 4-13 (time t0b in waveform 4 of FIG. 14). Similar to the case of the Lth frame, the potential on the third reference potential trunk line 4-13 is an intermediate value between the first reference potential trunk line 4-11 and the second reference potential trunk line 4-12.

The potential difference between −3 V of the display signal line 3-11 and 0 V of the first reference potential trunk line 4-11, this being −3 V, is generated at the liquid crystal capacitance 1-411 of the sub-pixel 411 of the pixel 401. Similarly, the potential difference between −3 V of the display signal line 3-11 and +2 V of the second reference potential trunk line 4-12, this being −5 V, is generated at the liquid crystal capacitance 1-412 of the sub-pixel 412. Similarly, the potential difference between −3 V of the display signal line 3-11 and +1 V of the third reference potential trunk line 4-13, this being −4 V, is generated at the liquid crystal capacitance 1-413 of the sub-pixel 413. As a result, the potential differences are in the sequence of sub-pixel 412 (−5 V)>sub-pixel 413 (−4 V)>sub-pixel 411 (−3 V). Also, the luminances of the sub-pixels 411 to 413, responsive to the potential differences, are in the sequence of sub-pixel 412>sub-pixel 413>sub-pixel 411.

Additionally, the operation of each sub-pixel 431 to 433 of the pixel 403 is the same as each of the sub-pixels 411 to 413 of the pixel 401.

The potential difference between +5 V of the display signal line 3-12 and +2 V of the second reference potential trunk line 4-12, this being +3 V, is generated at the liquid crystal capacitance 1-421 of the sub-pixel 421 of the pixel 402. Similarly, the potential difference between +5 V of the display signal line 3-12 and 0 V of the first reference potential trunk line 4-11, this being +5 V, is generated at the liquid crystal capacitance 1-422 of the sub-pixel 422. Similarly, the potential difference between +5 V of the display signal line 3-12 and +1 V of the third reference potential trunk line 4-13, this being +4 V, is generated at the liquid crystal capacitance 1-423 of the sub-pixel 423. As a result, the potential differences are in the sequence of sub-pixel 422 (+5 V)>sub-pixel 423 (+4 V)>sub-pixel 421 (+3 V). Also, the luminances, responsive to the potential differences, are in the sequence of sub-pixel 422>sub-pixel 423>sub-pixel 421.

The potential difference between −2 V of the display signal line 3-11 and +1 V of the third reference potential trunk line 4-13, this being −3 V, is generated at the liquid crystal capacitance 1-441 of the sub-pixel 441 of the pixel 404. Similarly, the potential difference between −2 V of the display signal line 3-11 and +2 V of the second reference potential trunk line 4-12, this being −4 V, is generated at the liquid crystal capacitance 1-442 of the sub-pixel 442. Similarly, the potential difference between −2 V of the display signal line 3-11 and 0 V of the first reference potential trunk line 4-11, this being −2 V, is generated at the liquid crystal capacitance 1-443 of the sub-pixel 443. As a result, the potential differences are in the sequence of sub-pixel 442 (−4 V)>sub-pixel 441 (−3 V)>sub-pixel 443 (−2 V). Also, the luminances of the sub-pixels 441 to 443, responsive to the potential differences, are in the sequence of sub-pixel 442>sub-pixel 441>sub-pixel 443.

Additionally, each of the sub-pixels 461 to 463 of the pixel 406 operates in the same manner as each of sub-pixels 441 to 443 of the pixel 404.

The potential difference between +4 V of the display signal line 3-12 and +1 V of the third reference potential trunk line 4-13, this being +3 V, is generated at the liquid crystal capacitance 1-451 of the sub-pixel 451 of the pixel 405. Similarly, the potential difference between +4 V of the display signal line 3-12 and 0 V of the first reference potential trunk line 4-11, this being +4 V, is generated at the liquid crystal capacitance 1-452 of the sub-pixel 452. Similarly, the potential difference between +4 of the display signal line 3-12 and +2 V of the second reference potential trunk line 4-12, this being +2 V, is generated at the liquid crystal capacitance 1-453 of the sub-pixel 453. As a result, the potential differences are in the sequence of sub-pixel 452 (+4 V)>sub-pixel 451 (+3 V)>sub-pixel 453 (+2 V). Also, the luminances of sub-pixels 451 to 453, responsive to the potential differences, are in the sequence of sub-pixel 452>sub-pixel 451>sub-pixel 453.

FIG. 15 is a drawing that describes an example of the layout on the first substrate 10. FIG. 15 shows the example in which each reference potential trunk lines is connected to each sub-pixel. In FIG. 15, each of the sub-pixels (switching elements 2 and display electrodes 11) 251-1 to 251-3 and 253-1 to 253-3 are connected to the reference potential trunk lines 4-11 to 4-13 via the connecting parts 252-1 to 252-4 and 254-1 to 254-2.

In this manner, in the third embodiment as well, even if sub-pixel of the same luminance region are disposed in the row direction, the lengths of the patterns connected the sub-pixels with the reference potential trunk lines are the same for each sub-pixel. For this reason, it is possible, without a reduction in the numerical aperture, to perform a layout that is equivalent to that of a conventional multipixel method (MPD) that has a plurality of pixels. Additionally, similar to the first embodiment, even if sub-pixels of the same luminance region are disposed so as to be adjacent in the row direction, the bright/dark disposition of each sub-pixel does not change for each frame. For this reason, even in an image with distinct edge it is possible to achieve a proper display.

Also, in FIG. 15, the plus sign "+" indicates that a positive potential is applied from the display signal line 3 in the Lth frame. The minus sign "−" indicates that a negative potential is applied from the display signal line 3 in the Lth frame.

As noted above, the third embodiment has an opposing matrix constitution. The source terminal of the switching element 2-411 connected to the liquid crystal capacitance 1-411 of the sub-pixel 411 and the source terminal of the switching element 2-422 connected to the liquid crystal capacitance 1-422 of the sub-pixel 422 are connected to the first reference potential trunk line 4-11. The source terminal of the switching element 2-412 connected to the liquid crystal capacitance 1-412 of the sub-pixel 412 and the source terminal of the switching element 2-421 connected to the liquid crystal capacitance 1-421 of the sub-pixel 421 are connected to the second reference potential trunk line 4-12. The source terminal of the switching element 2-413 connected to the liquid crystal capacitance 1-413 of the sub-pixel 413 and the source terminal of the switching element 2-423 connected to the liquid crystal capacitance 1-423 of the sub-pixel 423 are connected to the third reference potential trunk line 4-13.

Additionally, the controller 12 switches the polarity of the potential on the display signal lines 3-11 to 3-13 for each frame, and switches the potential on the reference potential trunk lines 4-11 to 4-13 for each frame. For this reason, even if one pixel is divided into three sub-pixels, it is possible to achieve a liquid crystal display device having a disposition that eliminates the alternating disposition of sub-pixels of different luminances, thereby enabling smooth rendering of a half-tone display.

[Fourth Embodiment]

The fourth embodiment will be described using FIG. 16 to FIG. 18.

Figure 16:
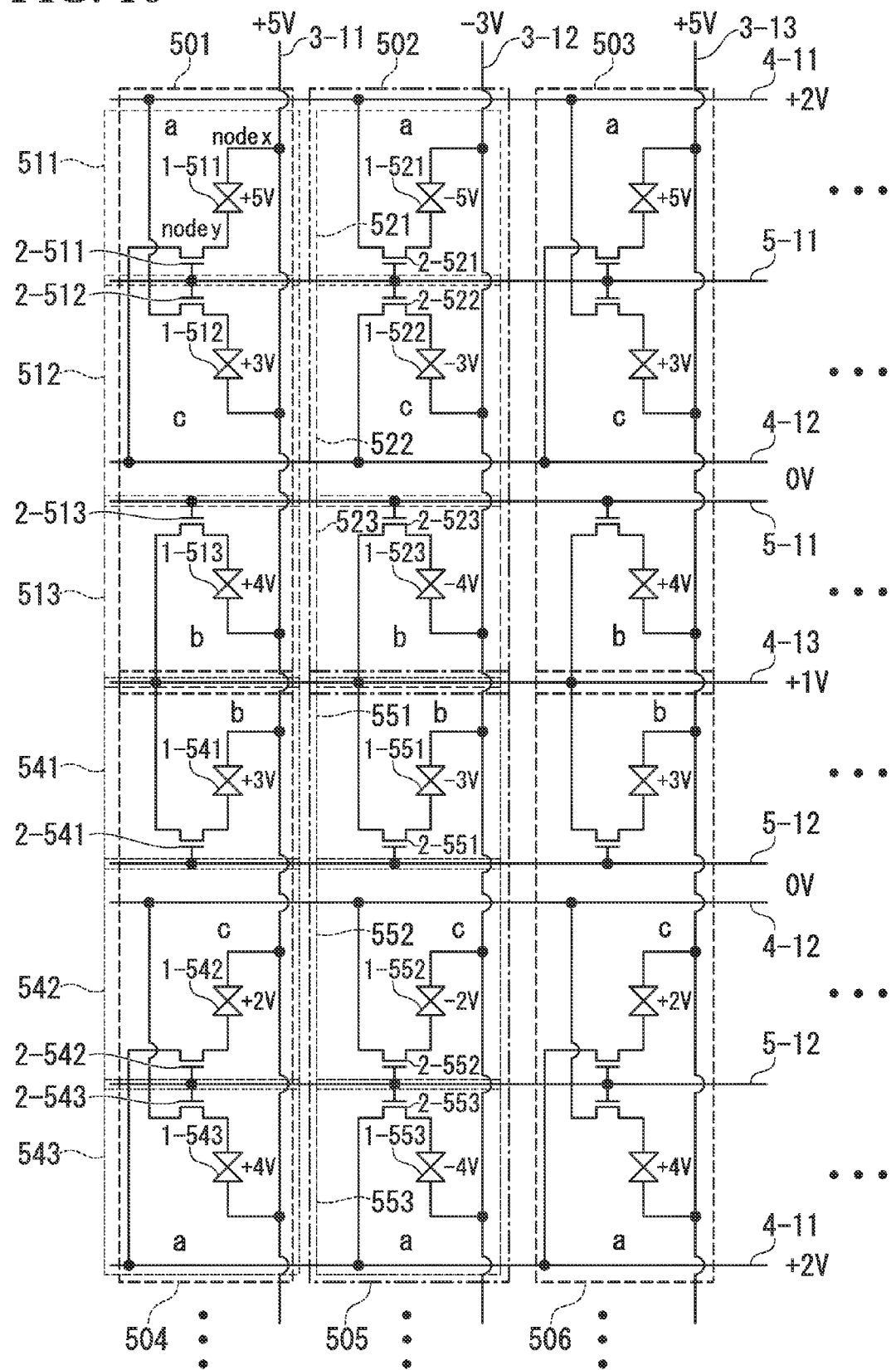
FIG. 16 is an equivalent circuit diagram describing the operation of the liquid crystal display device according to a fourth embodiment.
Figure 17:
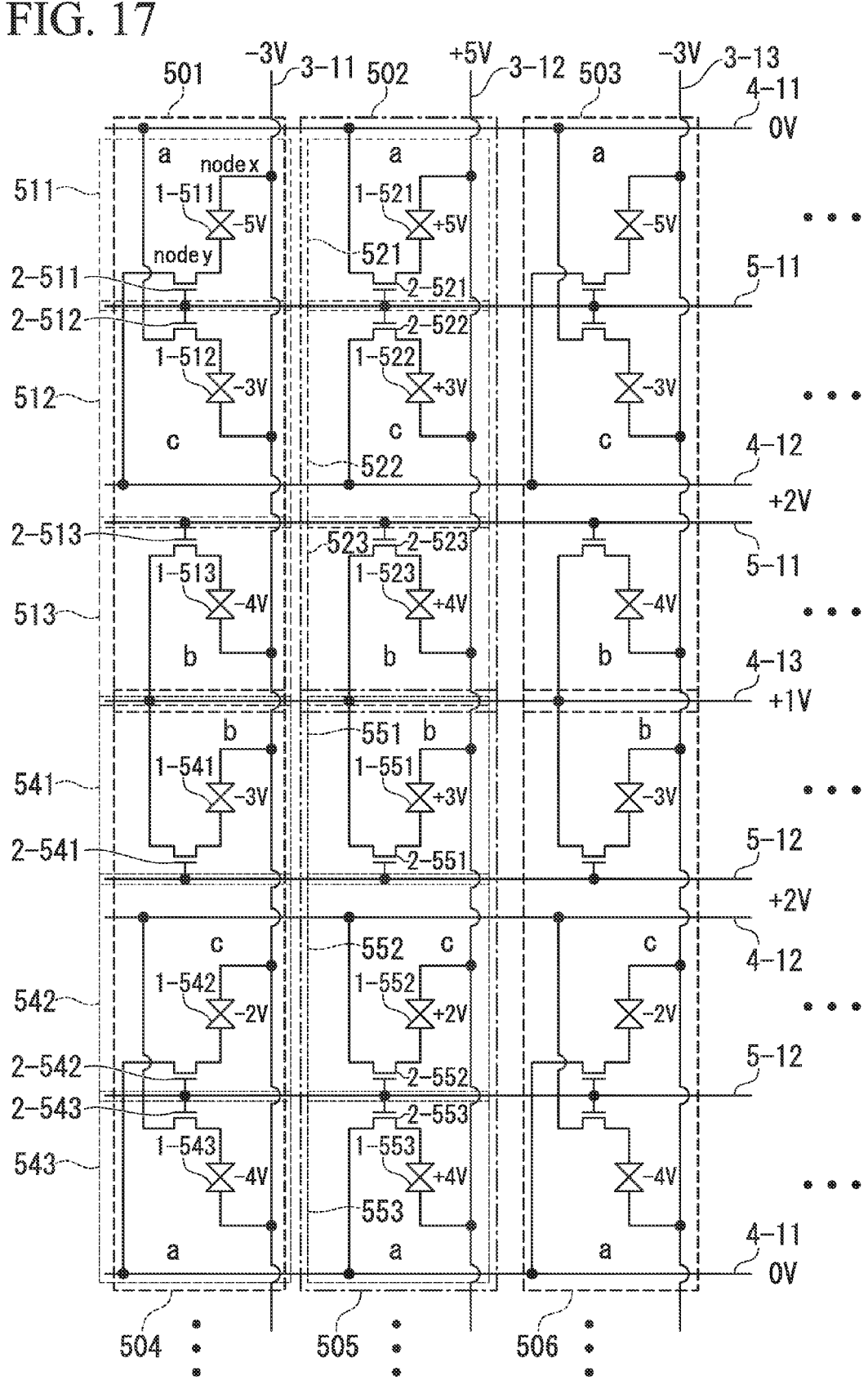
FIG. 17 is an equivalent circuit diagram describing the liquid crystal display device according to the same embodiment.

FIG. 16 and FIG. 17 are equivalent circuit diagrams that describe the operation of the liquid crystal display device according to the fourth embodiment. For the fourth embodiment, the description is for each pixel having three sub-pixels and for the case of line-inversion drive. Also, FIG. 16 and FIG. 17 show the condition for each frame. As shown in FIG. 16, the difference with respect to the third embodiment is the manner of connecting each of the sub-pixels of each of the pixels 501 to 506 with each of the reference potential trunk lines 4-11 to 4-13.

As shown in FIG. 16, a sub-pixel 511 of the pixel 501 is connected to the second reference potential trunk line 4-12 via a switching element 2-511. A sub-pixel 512 is connected to the first reference potential trunk line 4-11 via a switching element 2-512. A sub-pixel 513 is connected to the third reference potential trunk line 4-13 via a switching element 2-513. The pixel 501 and the pixel 502 are disposed so as to be adjacent in the row direction. The pixel 502 has, with respect to the column direction, the sub-pixel (first sub-pixel) 521, the sub-pixel (second sub-pixel) 522 and the sub-pixel (fifth sub-pixel) 523, disposed in that sequence. The pixel 501 has, with respect to the column direction, the sub-pixel (third sub-pixel) 511, the sub-pixel (fourth sub-pixel) 512 and the sub-pixel (sixth sub-pixel) 513, disposed in that sequence. The pixel 504 and the pixel 505, which are disposed so as to be adjacent in the row direction, are disposed in linear symmetry with the pixel 501 and the pixel 502, with respect to a third reference potential trunk line 4-13. The pixel 505 has, with respect to the column direction, the sub-pixel (first sub-pixel) 553, the sub-pixel (second sub-pixel) 552 and the sub-pixel (fifth sub-pixel) 551, disposed in that sequence. The pixel 504 has, with respect to the column direction, the sub-pixel (third sub-pixel) 543, the sub-pixel (fourth sub-pixel) 542 and the sub-pixel (sixth sub-pixel) 541, disposed in that sequence.

Additionally, the liquid crystal capacitances 1-511 to 1-513 of sub-pixels 511 to 513 are connected to the display signal line 3-11.

Additionally, the sub-pixel 521 of the pixel 502 is connected to the first reference potential trunk line 4-11 via the switching element 2-521. The sub-pixel 522 is connected to the second reference potential trunk line 4-12 via the switching element 2-522. The sub-pixel 523 is connected to the third reference potential trunk line 4-13 via the switching element 2-523. Additionally, the liquid crystal capacitances 1-521 to 1-523 of the sub-pixels 521 to 523 are connected to the display signal line 3-12.

The operation at the time of the Lth frame will be described using FIG. 16. A potential of +2 V is applied to the first reference potential trunk line 4-11, 0 V is applied to the second reference potential trunk line 4-12, and +1 V is applied to the third reference potential trunk line 4-13. That is, the potential on the third reference potential trunk line 4-13 is an intermediate value between the first reference potential trunk line 4-11 and the second reference potential trunk line 4-12. Also, as shown in FIG. 13, the controller 12 controls the potential on the display signal lines 3-11 to 3-13 in the same manner as in the third embodiment. That is, in the same manner as in the third embodiment, the signals on the display signal line 3-11 and the display signal line 3-13 are display examples in the case of +5 V with respect to the pixel at the first row, +4 V with respect to the pixel at the second row, and +3 V with respect to the pixel on and after the third row. The range of the various signals on each of the display signal lines 3-11 to 3-13 is, for example, a potential of +5 V to +2 V on the positive polarity side and −4 V to −1 V on the negative polarity side.

The potential difference between +5 V on the display signal line 3-11 and 0 V on the second reference potential trunk line 4-12, this being +5 V, is generated at the liquid crystal capacitance 1-511 of the sub-pixel 511 of the pixel 501. In the same manner, the potential difference between +5 V of the display signal line 3-11 and +2 V of the first reference potential trunk line 4-11, this being +3 V, is generated at the liquid crystal capacitance 1-512 of the sub-pixel 512. In the same manner, the potential difference between +5 V of the display signal line 3-11 and the +1 V of the third reference potential trunk line 4-13, this being +4 V, is generated at the liquid crystal capacitance 1-513 of the sub-pixel 513. As a result, the sequence of potential differences is sub-pixel 511 (+5 V)>sub-pixel 513 (+4 V)>sub-pixel 512 (+3 V). Also, the luminances of the sub-pixels 511 to 513, responsive to the potential differences, are in the sequence of sub-pixel 511>sub-pixel 513>sub-pixel 512.

Additionally, the operation of each of the sub-pixels 531 to 533 of the pixel 503 is the same as each of the sub-pixels 511 to 513 of the pixel 501.

Next, the potential difference between −3 V of the display signal line 3-12 and +2 V of the first reference potential trunk line 4-11, this being −5 V, is generated at the liquid crystal capacitance 1-521 of the sub-pixel 521 of the pixel 502. Similarly, the potential difference between −3 V of the display signal line 3-12 and 0 V of the second reference potential trunk line 4-12, this being −3 V, is generated at the liquid crystal capacitance 1-522 of the sub-pixel 522. Similarly, the potential difference between −3 V of the display signal line 3-12 and +1 V of the third reference potential trunk line 4-13, this being −4 V, is generated at the liquid crystal capacitance 1-523 of the sub-pixel 523. As a result, the sequence of potential differences is sub-pixel 521 (−5 V)>sub-pixel 523 (−4 V)>sub-pixel 522 (−3 V). Also, the luminances, responsive to the potential differences, are in the sequence of sub-pixel 521>sub-pixel 523>sub-pixel 522.

In the pixel 504, the sub-pixels 541 to 543 are, in the column direction, disposed in the sequence of the sub-pixel 541, the sub-pixel 542, and the sub-pixel 543. Each of the reference potential trunk lines, to which each of the switching elements 2-541 to 2-543 are connected, is the same as the pixel 501. Also, the controller 12 supplies +4 V from the display signal line 3-11 to the sub-pixels 541 to 543.

For this reason, the potential difference between +4 V of the display signal line 3-11 and +1 V on the third reference potential trunk line 4-13, this being +3 V, is generated at the liquid crystal capacitance 1-541 of the sub-pixel 541 of the pixel 504. Similarly, the potential difference between +4 V of the display signal line 3-11 and +2 V of the first reference potential trunk line 4-11, this being +2 V, is generated at the liquid crystal capacitance 1-542 of the sub-pixel 542. Similarly, the potential difference between +4 V of the display signal line 3-11 and 0 V of the second reference potential trunk line 4-12, this being +4 V, is generated at the liquid crystal capacitance 1-543 of the sub-pixel 543. As a result, the potential differences are in the sequence of sub-pixel 543 (+4 V)>sub-pixel 541 (+3 V)>sub-pixel 542 (+2 V). The luminances of the sub-pixels 541 to 543, responsive to the potential differences, are in the sequence of sub-pixel 543>sub-pixel 541>sub-pixel 542.

Additionally, the operation of each of the sub-pixels 561 to 563 of the pixel 506 is the same as each of the sub-pixels 541 to 543 of the pixel 504.

In the pixel 505, the sub-pixels 551 to 553 are, in the column direction, disposed in the sequence of the sub-pixel 551, the sub-pixel 552, and the sub-pixel 553. Each of the reference potential trunk lines 3-11 to 3-13, to which each of the switching element 2-551 to 2-553 are connected, is the same as the pixel 502. Also, the controller 12 supplies −2 V from the display signal line 3-12 to the sub-pixels 551 to 553.

For this reason, the potential difference between −2 V of the display signal line 3-12 and +1 V on the third reference potential trunk line 4-13, this being −3 V, is generated at the liquid crystal capacitance 1-551 of the sub-pixel 551 of the pixel 505. Similarly, the potential difference between −2 V of the display signal line 3-12 and 0 V of the second reference potential trunk line 4-12, this being −2 V, is generated at the liquid crystal capacitance 1-552 of the sub-pixel 552. Similarly, the potential difference between −2 V of the display signal line 3-12 and +2 V of the first reference potential trunk line 4-11, this being −4 V, is generated at the liquid crystal capacitance 1-553 of the sub-pixel 553. As a result, the potential differences are in the sequence of sub-pixel 553 (−4 V)>sub-pixel 551 (−3 V)>sub-pixel 552 (−2 V). The luminances of the sub-pixels 551 to 553, responsive to the potential differences, are in the sequence of sub-pixel 553>sub-pixel 551>sub-pixel 552.

Next, the operation at the (L+1)th frame will be described, using FIG. 17. The controller 12, during the vertical return interval, switches the polarity of the potentials on the display signal line 3-1 and the display signal line 3-3 to the reverse of the polarity at the Lth frame. As a result, as shown in FIG. 17, the controller 12 supplies, from the display signal line 3-11 and the display signal line 3-13, −3 V to the pixel 501 and the pixel 503 and −2 V to the pixel 504 and the pixel 506. The controller 12 supplies, from the display signal line 3-12, +5 V to the pixel 502 and +4 V to the pixel 505. The controller 12 switches the potential on the first reference potential trunk line 4-11 from +2 V to 0 V, and the potential on the second reference potential trunk line 4-12 from 0 V to +2 V, and applies +1 V to the third reference potential trunk line 4-13. That is, the potential on the third reference potential trunk line 4-13 is an intermediate value between the first reference potential trunk line 4-11 and the second reference potential trunk line 4-12.

The potential difference between −3 V of the display signal line 3-11 and +2 V of the second reference potential trunk line 4-12, this being −5 V, is generated at the liquid crystal capacitance 1-511 of the sub-pixel 511 of the pixel 501. Similarly, the potential difference between −3 V of the display signal line 3-11 and 0 V of the first reference potential trunk line 4-13, this being −3 V, is generated at the liquid crystal capacitance 1-512 of the sub-pixel 512. Similarly, the potential difference between −3 V of the display signal line 3-11 and +1 V of the third reference potential trunk line 4-13, this being −4 V, is generated at the liquid crystal capacitance 1-513 of the sub-pixel 513. As a result, the potential differences are in the sequence of sub-pixel 511 (−5 V)>sub-pixel 513 (−4 V)>sub-pixel 512 (−3 V). Also, the luminances of the sub-pixels 511 to 513, responsive to the potential differences, are in the sequence of sub-pixel 511>sub-pixel 513>sub-pixel 512.

Additionally, the operation of each sub-pixel 531 to 533 of the pixel 503 is the same as each of the sub-pixels 511 to 513 of the pixel 501.

The potential difference between +5 V of the display signal line 3-12 and 0 V of the first reference potential trunk line 4-11, this being +5 V, is generated at the liquid crystal capacitance 1-521 of the sub-pixel 511 of the pixel 521. Similarly, the potential difference between +5 V of the display signal line 3-12 and +2 V of the second reference potential trunk line 4-12, this being +3 V, is generated at the liquid crystal capacitance 1-522 of the sub-pixel 522. Similarly, the potential difference between +5 V of the display signal line 3-12 and +1 V of the third reference potential trunk line 4-13, this being +4 V, is generated at the liquid crystal capacitance 1-523 of the sub-pixel 523. As a result, the potential differences are in the sequence of sub-pixel 521 (+5 V)>sub-pixel 523 (+4 V)>sub-pixel 523 (+3 V). Also, the luminances, responsive to the potential differences, are in the sequence of sub-pixel 521>sub-pixel 523>sub-pixel 523.

The potential difference between −2 V of the display signal line 3-11 and +1 V of the third reference potential trunk line 4-13, this being −3 V, is generated at the liquid crystal capacitance 1-541 of the sub-pixel 541 of the pixel 504. Similarly, the potential difference between −2 V of the display signal line 3-11 and 0 V of the first reference potential trunk line 4-11, this being −2 V, is generated at the liquid crystal capacitance 1-542 of the sub-pixel 542. Similarly, the potential difference between −2 V of the display signal line 3-11 and +2 V of the second reference potential trunk line 4-12, this being −4 V, is generated at the liquid crystal capacitance 1-543 of the sub-pixel 543. As a result, the potential differences are in the sequence of sub-pixel 543 (−4 V)>sub-pixel 541 (−3 V)>sub-pixel 542 (−2 V). Also, the luminances, responsive to the potential differences, are in the sequence of sub-pixel 543>sub-pixel 541>sub-pixel 542.

Additionally, each of the sub-pixels 561 to 563 of the pixel 506 operates in the same manner as each of sub-pixels 541 to 543 of the pixel 504.

The potential difference between +4 V of the display signal line 3-12 and +1 V of the third reference potential trunk line 4-13, this being +3 V, is generated at the liquid crystal capacitance 1-551 of the sub-pixel 551 of the pixel 505. Similarly, the potential difference between +4 V of the display signal line 3-12 and +2 V of the second reference potential trunk line 4-12, this being +2 V, is generated at the liquid crystal capacitance 1-552 of the sub-pixel 552. Similarly, the potential difference between +4 of the display signal line 3-12 and 0 V of the first reference potential trunk line 4-11, this being +4 V, is generated at the liquid crystal capacitance 1-553 of the sub-pixel 553. As a result, the potential differences are in the sequence of sub-pixel 553 (+4 V)>sub-pixel 551 (+3 V)>sub-pixel 552 (+2 V). Also, the luminances of sub-pixels 551 to 553, responsive to the potential differences, are in the sequence of sub-pixel 553>sub-pixel 551>sub-pixel 552. In FIG. 16 and FIG. 17, the symbols a, b, and c represent the sequence of luminances, which is the sequence a>b>c.

Figure 18:
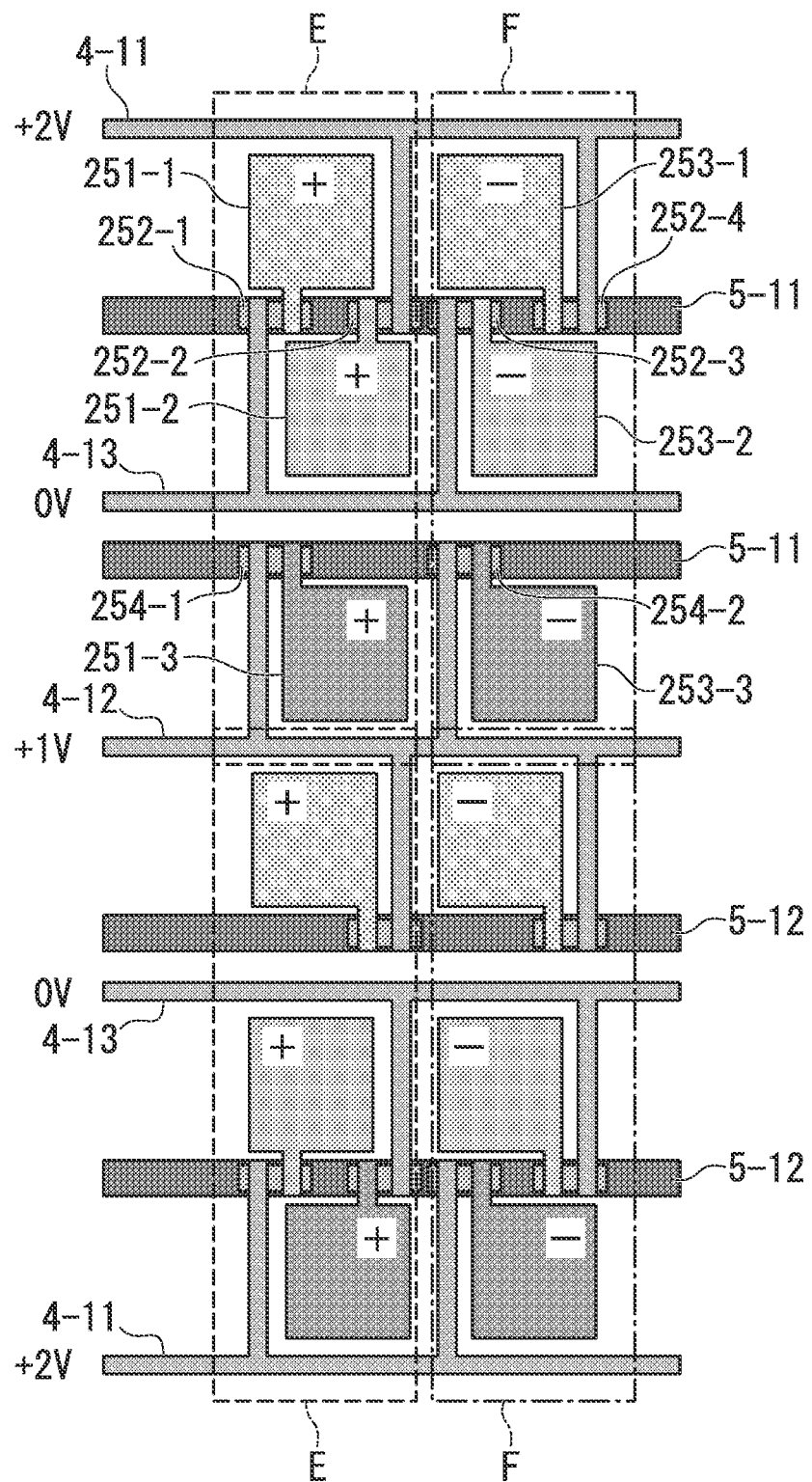
FIG. 18 is a drawing describing a layout example on the first substrate 10 according to the same embodiment.
Figure 19:
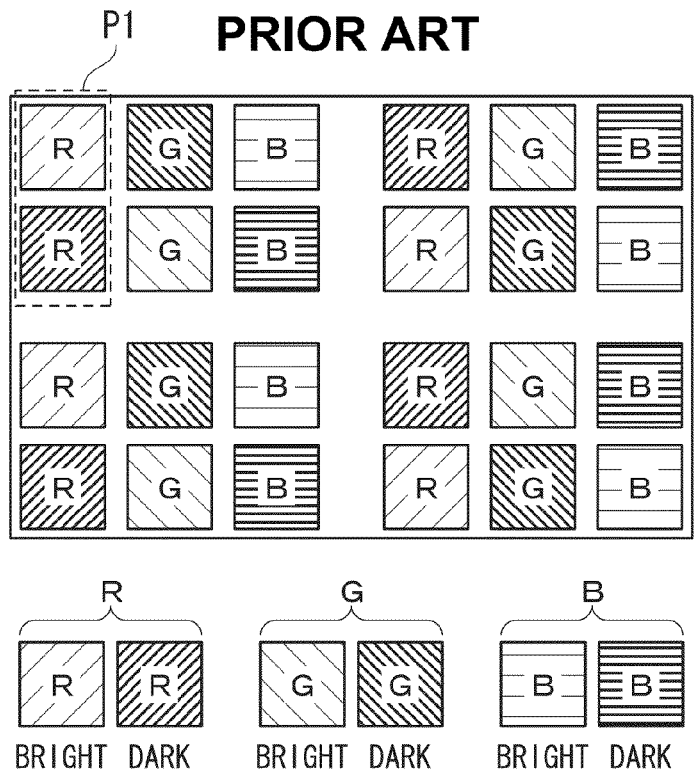
FIG. 19 is a drawing describing the bright/dark relationship of pixels in a conventional multipixel method.
Figure 20:
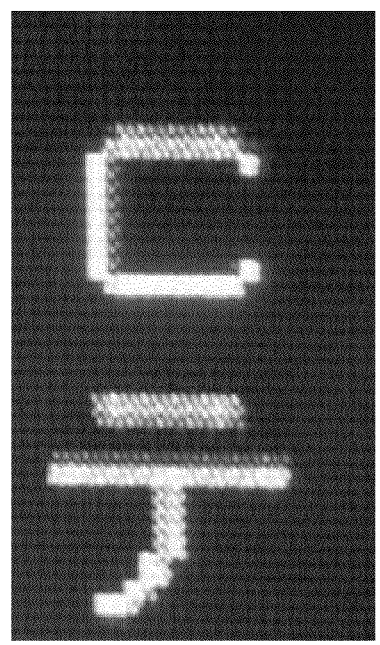
FIG. 20 is a drawing describing one example of displaying a half-tone character in the conventional multipixel method.

FIG. 18 is a drawing that describes an example of the layout on the first substrate 10. FIG. 18 shows the example in which each of the reference potential trunk lines is connected to each sub-pixel. In FIG. 18, each of the sub-pixels (switching elements 2 and display electrodes 11) 251-1 to 251-3 and 253-1 to 253-4 is connected to the reference potential trunk lines 4-11 to 4-13 via the connecting parts 252-1 to 252-4 and 254-1 to 254-2.

In this manner, in the fourth embodiment as well, even if sub-pixel of the same luminance region are disposed in the row direction, there is no crossing over between the patterns connected the sub-pixels with the reference potential trunk lines. For this reason, it is possible to perform a layout that is equivalent to that of a conventional multipixel method (MPD) that has a plurality of pixels. Similar to the first embodiment, in the fourth embodiment, the bright/dark disposition of each sub-pixel does not change for each frame.

Also, in FIG. 18, the plus sign "+" indicates that a positive potential is applied from the display signal line 3 in the Lth frame. The minus sign "−" indicates that a negative potential is applied from the display signal line 3 in the Lth frame.

As noted above, the fourth embodiment has an opposing matrix constitution. The source terminal of the switching element 2-521 connected to the liquid crystal capacitance 1-521 of the sub-pixel 521 and the source terminal of the switching element 2-512 connected to the liquid crystal capacitance 1-512 of the sub-pixel 512 are connected to the first reference potential trunk line 4-11. The source terminal of the switching element 2-522 connected to the liquid crystal capacitance 1-522 of the sub-pixel 522 and the source terminal of the switching element 2-511 connected to the liquid crystal capacitance 1-511 of the sub-pixel 511 are connected to the second reference potential trunk line 4-12. The source terminal of the switching element 2-523 connected to the liquid crystal capacitance 1-523 of the sub-pixel 523 and the source terminal of the switching element 2-513 connected to the liquid crystal capacitance 1-513 of the sub-pixel 513 are connected to the third reference potential trunk line 4-13. Additionally, the controller 12 switches the polarity of the potential on the display signal lines 3-11 to 3-13 for each frame, and switches the potential on the reference potential trunk lines 4-11 to 4-13 for each frame. For this reason, it is possible to achieve a liquid crystal display device having a disposition that eliminates the alternating disposition of sub-pixels of different luminances, thereby enabling smooth rendering of a half-tone display.

In the first to fourth embodiments, although the operation of the liquid crystal display device according to the present invention is described regarding a constitution of six pixels, the number of pixels may be further extended in the row direction and in the column direction.

Also, in the first to fourth embodiments, the examples of each pixel having two sub-pixels and three sub-pixels have been described. In a similar manner, however, a constitution of an opposing matrix may be possible such that the display signal line 3 is disposed on the second substrate 20 and the scanning line 5, the reference potential trunk lines 4, the display electrodes 11 connected to each sub-pixel and the switching elements connected to each display electrode are disposed on the first substrate 10. Additionally, the interconnect between the source terminal of each switching element 2 connected to each liquid crystal capacitance 1 with each reference potential trunk line 4 and the interconnect between each liquid crystal capacitance 1 and each display signal line 3 may be arranged so that all sub-pixels disposed in the row direction are arranged in the same luminance region. Additionally, the controller 12 may switch the polarity of the potential on each display signal line 3 for each frame, and may switch the potential on each of the reference potential trunk lines 4 for each frame. By doing this, even if each pixel has four or more sub-pixels, it is possible to achieve a liquid crystal display device having a disposition that eliminates the alternating disposition of sub-pixels of different luminances that is the problem in the conventional art.

In the third and fourth embodiments, the example in the case in which the potential on the third reference potential trunk line 4-13 is an intermediate value between the first reference potential trunk line 4-11 and the second reference potential trunk line 4-12 has been described. The potential of the third reference potential trunk line 4-13, however, may be a potential between the first reference potential trunk line 4-11 and the second reference potential trunk line 4-12, for example, 0 V<potential of the third reference potential trunk line 4-13<+2V.

In the first to fourth embodiments, if the potentials on each display signal line 3 and each reference potential trunk line 4 are maintained at a polarity and magnitude of potential that maintains the noted bright/dark relationship, potentials other than those used in the description may be possible.

In the embodiments, although examples such as switching the potential on the reference potential trunk lines 4-1 to 4-3 or on the reference potential trunk lines 4-11 to 4-13 for each frame have been described, the switching may be done during the pixel selection period. The pixel selection period is, for example, in the case of a display device driven by 60-Hz with a Full HD resolution (having 1080 scanning lines), every 1/60/1080 s. Additionally, if the pixel selection period is defined as 1H, the potential may be switched every 2 kH (where k is an integer of one or larger). In this case, the disposition pattern of the adjacent pixels is not limited to a repetition pattern as shown in FIG. 5A and FIG. 5B, such as such as ABAB . . . , and the disposition may be a repetition of a prescribed pattern, such as AABBAA . . . .

Industrial Applicability

The present invention eliminates the alternating disposition of sub-pixels of the same luminance region and is applicable to a liquid crystal display device capable of smooth edge display, even in a half-tone display.

REFERENCE SYMBOLS

1: Liquid crystal capacitance
2: Switching element
3: Display signal line
4: Scanning line
5: Reference potential trunk line
10: First substrate
11: Display electrode
12: Controller
13: Transparent electrode
20: Second substrate

The invention claimed is:

1. A liquid crystal display device comprising:
a first substrate, on which a reference potential trunk line that supplies a reference potential to a plurality of sub-pixels and a switching element of each of the plurality of sub-pixels, are disposed; and
a second substrate, on which a display signal line that supplies a display signal, is disposed, wherein:
a liquid crystal capacitance of each of the plurality of sub-pixels is formed between the first substrate and the second substrate;
pixels composed of the plurality of sub-pixels that correspond to a plurality of luminance regions are arranged in a matrix;
in case that a prescribed half-tone is displayed in between pixels that are adjacent in the row direction, the plurality of sub-pixels that correspond to the same luminance region are arranged adjacently in the row direction;
the reference potential trunk line comprises: a first reference potential trunk line and a second reference potential trunk line; and
the liquid crystal display comprises the display signal line;
the liquid crystal display further comprising:
a controller that switches potential of the first reference potential trunk line for each frame and that also switches the potential of the second reference potential trunk line for each frame to the inverse phase with respect to the first reference trunk line; and
a scanning line disposed in the row direction of a matrix;
a first pixel in which the first sub-pixel is disposed between the first reference potential trunk line and the scanning line and the second sub-pixel is disposed between the second reference potential trunk line and the scanning line; and
a second pixel in which the second sub-pixel is disposed between the first reference potential trunk line and the scanning line and the first sub-pixel is disposed between the second reference potential trunk line and the scanning line; wherein
one end of the liquid crystal capacitance of a first sub-pixel is connected to the display signal line and the other end thereof is connected to the first reference potential trunk line via the switching element;
one end of the liquid crystal capacitance of a second sub-pixel adjacent to the first sub-pixel in the column direction is connected to the display signal line and the other end thereof is connected to the second reference potential trunk line via the switching element; and
the first sub-pixel and the second sub-pixel are repeatedly arranged in a prescribed pattern in the row direction.

2. The liquid crystal display device according to claim 1, wherein the arrangement patterns of the first pixel and the second pixel coincide with the polarity-reversal pattern of the pixel drive.

3. The liquid crystal display device according to claim 1, wherein
the display signal line comprises a first display signal line supplying a display signal and a second display signal line supplying a display signal; and
the controller alternately switches the polarity of the potential on the first display signal line for each row of a pixel and also alternately switches the polarity of the potential on the second display signal line for the each row of a pixel into the inverse polarity with respect to that of the first display signal line, so as to alternately switch the polarities of the potentials of the first display signal line and the second display signal line for each frame.

4. The liquid crystal display device according to claim 3, wherein the controller
supplies the display signal to the first display signal line in case that controlling the switching element of the first sub-pixel and the switching element of a third sub-pixel adjacent thereof to be on, via the scanning line;
supplies the display signal to the second display signal line in case that controlling the switching element of the second sub-pixel and the switching element of a fourth sub-pixel adjacent thereof to be on, via the scanning line; and
switches the polarities of the potentials of the display signals on the first and second display lines during the vertical return interval.

5. The liquid crystal display device according to claim 1, wherein the controller switches the polarity of the potential on the first display signal line for each frame and also switches the polarity of the potential on the second display signal line for each frame into the inverse polarity with respect to that of the first display signal line.

6. The liquid crystal display device according to claim 1, further comprising a third reference potential trunk line,
wherein one end of the liquid crystal capacitance of a fifth sub-pixel adjacent to the second sub-pixel in the column direction is connected to the first display signal line and the other end thereof is connected to the third reference potential trunk line via the switching element;
one end of the liquid crystal capacitance of a sixth sub-pixel adjacent to the fourth sub-pixel in the column direction is connected to the second display signal line and the other end thereof is connected to the third reference potential trunk line via the switching element; and
the controller controls the potential of the third reference potential trunk line to a potential between the potential of the first reference potential trunk line and the potential of the second reference potential trunk line.

* * * * *